(12) United States Patent
Nishida

(10) Patent No.: US 11,004,161 B2
(45) Date of Patent: May 11, 2021

(54) RESERVATION SYSTEM

(75) Inventor: Norimasa Nishida, Tokyo (JP)

(73) Assignee: TOYOKO INN IT SHUUKYAKU SOLUTION CO., LTD., Tokyo (JP)

( * ) Notice: Subject to any disclaimer, the term of this patent is extended or adjusted under 35 U.S.C. 154(b) by 88 days.

(21) Appl. No.: 12/737,343

(22) PCT Filed: Jun. 30, 2009

(86) PCT No.: PCT/JP2009/062018
§ 371 (c)(1),
(2), (4) Date: Dec. 30, 2010

(87) PCT Pub. No.: WO2010/001914
PCT Pub. Date: Jan. 7, 2010

(65) Prior Publication Data
US 2011/0099038 A1    Apr. 28, 2011

(30) Foreign Application Priority Data
Jun. 30, 2008  (JP) .............................. JP2008-171888

(51) Int. Cl.
*G06Q 50/12* (2012.01)
*G06Q 10/02* (2012.01)

(52) U.S. Cl.
CPC ............. *G06Q 50/12* (2013.01); *G06Q 10/02* (2013.01)

(58) Field of Classification Search
CPC ................................ G06Q 50/12; G06Q 10/02
See application file for complete search history.

(56) References Cited

U.S. PATENT DOCUMENTS 7,076,451 B1 * 7/2006 Coupland .............. G06Q 10/02
                                                                 705/5
7,328,166 B1 * 2/2008 Geoghegan ............ G06Q 10/02
                                                                 705/5
(Continued)

FOREIGN PATENT DOCUMENTS

JP    2001-250005    9/2001
JP    2002-109340    4/2002
(Continued)

OTHER PUBLICATIONS

Bill Carroll, "European Hotels: Managing Hospitality Distribution", published by PhoCusWright Inc, on Aug. 2005 (Year: 2005).*
(Continued)

Primary Examiner — Omar Zeroual
(74) Attorney, Agent, or Firm — Hauptman Ham, LLP

(57) ABSTRACT

A reservation system for lodging has a first computer and a second computer, in which the first computer has data of available facilities and accepts user's input of lodging date and facility, and the second computer that accesses the first computer through a network and manages vacancy data of facilities. The second computer accesses a plurality of the first computers and their databases to search available facilities, and is capable of accessing other first computers for searching and reserving available facilities. Situation where reservation is not made even when a vacant room is available is prevented by accessing a plurality of the first computers.

4 Claims, 37 Drawing Sheets

(56) References Cited

U.S. PATENT DOCUMENTS

| | | | | |
|---|---|---|---|---|
| 7,584,110 B2* | 9/2009 | Robertson | G06Q 10/00 | 235/375 |
| 7,693,750 B2* | 4/2010 | Christensen | G06Q 30/0629 | 705/14.1 |
| 7,797,187 B2* | 9/2010 | Crean | G06Q 10/02 | 705/7.35 |
| 7,937,330 B2* | 5/2011 | Handel | G06Q 10/08345 | 705/330 |
| 7,966,213 B2* | 6/2011 | Messa | G06Q 50/12 | 705/7.37 |
| 7,974,863 B2* | 7/2011 | Etzioni | G06Q 30/0611 | 705/5 |
| 8,117,073 B1* | 2/2012 | Orttung | G06Q 10/1095 | 705/26.43 |
| 8,126,776 B2* | 2/2012 | Messa | G06Q 20/204 | 705/15 |
| 8,200,514 B1* | 6/2012 | Crean | G06Q 10/02 | 705/5 |
| 8,290,785 B2* | 10/2012 | Francis | G06Q 10/02 | 705/1.1 |
| 8,374,895 B2* | 2/2013 | Crean | G06Q 10/02 | 705/5 |
| 8,392,224 B2* | 3/2013 | Crean | G06Q 10/02 | 705/5 |
| 8,484,057 B2* | 7/2013 | Crean | G06Q 10/02 | 705/5 |
| 8,856,117 B2* | 10/2014 | McCullough | G06Q 10/087 | 707/736 |
| 9,161,994 B1* | 10/2015 | Billington | G06Q 50/14 | |
| 9,226,975 B1* | 1/2016 | Orttung | A61K 48/00 | |
| 9,552,599 B1* | 1/2017 | Alag | H04L 65/1063 | |
| 10,217,131 B2* | 2/2019 | Handel | G06Q 10/00 | |
| 10,552,849 B2* | 2/2020 | Mortimore, Jr. | G06Q 30/0226 | |
| 2002/0156684 A1* | 10/2002 | Stone | G06Q 30/0633 | 705/22 |
| 2003/0036929 A1* | 2/2003 | Vaughan | G06Q 30/0633 | 705/5 |
| 2003/0040946 A1* | 2/2003 | Sprenger | G06Q 30/06 | 705/6 |
| 2003/0061145 A1* | 3/2003 | Norrid | G06Q 40/04 | 705/37 |
| 2003/0177044 A1* | 9/2003 | Sokel | G06Q 10/02 | 705/5 |
| 2007/0220565 A1* | 9/2007 | Angel | H04N 21/812 | 725/87 |

FOREIGN PATENT DOCUMENTS

| | | |
|---|---|---|
| JP | 2004-062861 | 2/2004 |
| JP | 2008-026987 | 2/2008 |

OTHER PUBLICATIONS

Woody Kim, "Online Distribution: Who is in control?", published in the "proceedings of the First Hospitality and leisure: Business Advances and Applied research conference", on Jul. 5-6, 2007, pp. 232-236 (Year: 2007).*

* cited by examiner

FIG. 3   EXAMPLE OF DATABASE OF LODGING RESERVATION SITE SERVER 3

RESERVATION INFORMATION DB 331

| RESERVATION NO. | HOTEL NAME | ROOM TYPE | LODGING DATE | SUBSCRIBER | ... | STATUS |
|---|---|---|---|---|---|---|
| ○○○○ | HOTEL XXX | SINGLE | DD/MM | ○○○○ | ... | RESERVED |
| ○○○○ | HOTEL XXX | DOUBLE | DD/MM | ○○○○ | ... | RESERVED |
| ○○○○ | FRANCHISE HOTEL A | SINGLE | DD/MM | ○○○○ | ... | RESERVED |
| ○○○○ | HOTEL XXX | SINGLE | DD/MM | ○○○○ | ... | RESERVED |
| ⋮ | ⋮ | ⋮ | | ⋮ | ⋮ | ⋮ |

FIG. 4   EXAMPLE OF DATABASE OF LODGING RESERVATION SITE SERVER 3 vacant ROOM INFORMATION DB 332

| HOTEL NAME | ROOM TYPE | SCHEDULED LODGING DATE | ALLOTTED NO. | REMAINING ROOMS | |
|---|---|---|---|---|---|
| HOTEL XXX | SINGLE | DD/MM | 10 ROOMS | 4 ROOMS | ... |
| HOTEL XXX | DOUBLE | DD/MM | 10 ROOMS | 6 ROOMS | ... |
| HOTEL XXX | SINGLE | DD/MM | 5 ROOMS | 3 ROOMS | ... |
| ⋮ | ⋮ | ⋮ | ⋮ | ⋮ | |

FIG. 5

EXAMPLE OF DATABASE OF LODGING RESERVATION SITE SERVER 3

HOTEL INFORMATION DB 333

| HOTEL NAME | LOCATION | ROOM TYPE | ROOM CHARGE | SCHEDULED LODGING DATE REFERRING LOCATION | |
|---|---|---|---|---|---|
| HOTEL XXX | TOKYO | SINGLE | OOO YEN | REFER VACANT ROOM INFORMATION DB 332 | ... |
| HOTEL XXX | OSAKA | DOUBLE | OOO YEN | REFER VACANT ROOM INFORMATION DB 332 | ... |
| FRANCHISE HOTEL A | SHINJUKU | SINGLE | OOO YEN | LINKED TO <http:xxx.xxx.xxx> | ... |
| HOTEL XXX | YOKOHAMA | SINGLE | OOO YEN | REFER VACANT ROOM INFORMATION DB 332 | ... |
| ⋮ | ⋮ | ⋮ | ⋮ | ⋮ | |

FIG. 6

EXAMPLE OF DATABASE OF LODGING RESERVATION SITE SERVER 3

USER DB 334

| USER ID | NAME | ADDRESS | ... | PASSWORD |
|---|---|---|---|---|
| x x x x x | OOOO | CITY/TOWN | ... | x x x x x |
| x x x x x | OOOO | CITY/TOWN | ... | x x x x x |
| x x x x x | OOOO | CITY/TOWN | ... | x x x x x |
| x x x x x | OOOO | CITY/TOWN | ... | x x x x x |
| ⋮ | ⋮ | ⋮ | ⋮ | ⋮ |

FIG. 7

EXAMPLE OF DATABASE OF FRANCHISE HOTEL MANAGEMENT SERVER 10

RESERVATION INFORMATION DB 131

| HOTEL NAME | ROOM TYPE | LODGING DATE | SUBSCRIBER | - - - | STATUS |
|---|---|---|---|---|---|
| FRANCHISE HOTEL A | DOUBLE | June 11, 2008 | SUZUKI HANAKO | - - - | RESERVED |
| FRANCHISE HOTEL A | SINGLE | June 12, 2008 | TANAKA JIRO | - - - | RESERVED |
| FRANCHISE HOTEL B | SINGLE | June 12, 2008 | SATO TARO | - - - | RESERVED |
| FRANCHISE HOTEL B | SINGLE | June 12, 2008 | OTA ICHIRO | - - - | RESERVED |
| : | : | : | : | : | : |

FIG. 8

EXAMPLE OF DATABASE OF FRANCHISE HOTEL MANAGEMENT SERVER 10 vacant ROOM INFORMATION DB 132

| HOTEL NAME | ROOM TYPE | SCHEDULED LODGING DATE | - - - | REMAINING ROOMS |
|---|---|---|---|---|
| FRANCHISE HOTEL A | SINGLE | June 10, 2008 | - - - | 25 |
| FRANCHISE HOTEL A | DOUBLE | June 10, 2008 | - - - | 33 |
| FRANCHISE HOTEL A | DOUBLE | June 11, 2008 | - - - | 18 |
| FRANCHISE HOTEL B | DOUBLE | June 12, 2008 | - - - | 21 |
| ⋮ | ⋮ | ⋮ | ⋮ | ⋮ |

FIG. 9

EXAMPLE OF DATABASE OF FRANCHISE HOTEL A SERVER 2

RESERVATION INFORMATION DB 231

| HOTEL NAME | ROOM TYPE | LODGING DATE | SUBSCRIBER | - - - | STATUS |
|---|---|---|---|---|---|
| FRANCHISE HOTEL A | DOUBLE | June 11, 2008 | SUZUKI HANAKO | - - - | RESERVED |
| FRANCHISE HOTEL A | SINGLE | June 12, 2008 | TANAKA JIRO | - - - | RESERVED |
| ⋮ | ⋮ | ⋮ | ⋮ | ⋮ | ⋮ |

FIG. 10

EXAMPLE OF DATABASE OF FRANCHISE HOTEL A SERVER 2 vacant ROOM INFORMATION DB 232

| HOTEL NAME | ROOM TYPE | SCHEDULED LODGING DATE | --- | REMAINING ROOMS |
|---|---|---|---|---|
| FRANCHISE HOTEL A | SINGLE | June 10, 2008 | --- | 25 |
| FRANCHISE HOTEL A | DOUBLE | June 11, 2008 | --- | 33 |
| FRANCHISE HOTEL A | DOUBLE | June 12, 2008 | --- | 18 |
| : | : | : | : | : |

FIG. 12

ACCOMMODATION SELECTING SCREEN
OF USER TERMINAL 4
(DISPLAY LODGING
RESERVATION SITE SERVER 3)

| HOTEL NAME | ROOM CHARGE |
|---|---|
| HOTEL XXX | X,XXX YEN |
| HOTEL XXX | X,XXX YEN |
| FRANCHISE HOTEL A | X,XXX YEN |
| HOTEL XXX | X,XXX YEN |
| : | : |

FIG. 13

RESERVATION INFORMATION INPUT
SCREEN OF USER TERMINAL 4
(DISPLAY FRANCHISE HOTEL
MANAGEMENT SERVER 10)

| | |
|---|---|
| NAME OF SUBSCRIBER | XXXXX |
| NAME OF LODGER | XXXXX |
| TELEPHONE NO. | XXXXX |
| HOTEL NAME | XXXXX |
| : | |

FIG. 14

RESERVATION COMPLETION
CHECKING SCREEN OF USER TERMINAL 4
(DISPLAY LODGING RESERVATION SITE
SERVER 3)

| | |
|---|---|
| RESERVATION NO. | XXXXX |
| DETAIL OF RESERVATION | XXXXX |
| : | |
| : | |

FIG. 16

OPTION SEARCH WORK TABLE

| HOTEL NAME | ROOM TYPE | RESERVATION DATE | ROOM CHARGE | SCHEDULED LODGING DATE | VACANT ROOM | |
|---|---|---|---|---|---|---|
| HOTEL XXX | SINGLE | DD/MM | OOO YEN | REFER VACANT ROOM DB 332 | YES | ... |
| FRANCHISE HOTEL A | SINGLE | DD/MM | OOO YEN | LINKED TO <http:xxx.xxx.xxx> | NO | ... |
| HOTEL XXX | DOUBLE | DD/MM | OOO YEN | REFER VACANT ROOM DB 332 | YES | ... |
| FRANCHISE HOTEL B | SINGLE | DD/MM | OOO YEN | LINKED TO <http:xxx.xxx.xxx> | YES | ... |
| HOTEL XXX | SINGLE | DD/MM | OOO YEN | REFER VACANT ROOM DB 332 | NO | ... |
| ⋮ | ⋮ | ⋮ | ⋮ | ⋮ | ⋮ | |

FIG. 17

MODIFICATION OF DATA BY RESERVATION REGISTRATION
(SERVER 2 OF FRANCHISE HOTEL A)

A. BEFORE RESERVATION REGISTRATION

RESERVATION INFORMATION DB 231

| HOTEL NAME | ROOM TYPE | LODGING DATE | SUBSCRIBER | ... | STATUS |
|---|---|---|---|---|---|
| FRANCHISE HOTEL A | DOUBLE | June 11, 2008 | SUZUKI HANAKO | --- | RESERVED |
| FRANCHISE HOTEL A | SINGLE | June 12, 2008 | TANAKA JIRO | --- | RESERVED |
| ... | | | | | | vacant ROOM INFORMATION DB 232

| HOTEL NAME | ROOM TYPE | SCHEDULED LODGING DATE | ... | REMAINING ROOMS |
|---|---|---|---|---|
| FRANCHISE HOTEL A | SINGLE | June 10, 2008 | --- | 25 |
| FRANCHISE HOTEL A | DOUBLE | June 10, 2008 | --- | 33 |
| FRANCHISE HOTEL A | DOUBLE | June 12, 2008 | --- | 18 |
| ... | | | | |

B. AFTER RESERVATION REGISTRATION

RESERVATION INFORMATION DB 231

| HOTEL NAME | ROOM TYPE | LODGING DATE | SUBSCRIBER | ... | STATUS |
|---|---|---|---|---|---|
| FRANCHISE HOTEL A | SINGLE | June 10, 2008 | YAMADA TARO | --- | RESERVED |
| FRANCHISE HOTEL A | DOUBLE | June 11, 2008 | SUZUKI HANAKO | --- | RESERVED |
| FRANCHISE HOTEL A | SINGLE | June 12, 2008 | TANAKA JIRO | --- | RESERVED |
| ... | | | | | | vacant ROOM INFORMATION DB 232

| HOTEL NAME | ROOM TYPE | SCHEDULED LODGING DATE | ... | REMAINING ROOMS |
|---|---|---|---|---|
| FRANCHISE HOTEL A | SINGLE | June 10, 2008 | --- | 24 |
| FRANCHISE HOTEL A | DOUBLE | June 10, 2008 | --- | 33 |
| FRANCHISE HOTEL A | DOUBLE | June 12, 2008 | --- | 18 |
| ... | | | | |

FIG. 18

MODIFICATION OF DATA BY UPDATING RESERVATION INFORMATION
(FRANCHISE HOTEL MANAGEMENT SERVER 10)

A. BEFORE UPDATE OF RESERVATION INFORMATION

RESERVATION INFORMATION DB 131

| HOTEL NAME | ROOM TYPE | LODGING DATE | SUBSCRIBER | ... | STATUS |
|---|---|---|---|---|---|
| FRANCHISE HOTEL A | DOUBLE | June 11, 2008 | SUZUKI HANAKO | --- | RESERVED |
| FRANCHISE HOTEL A | SINGLE | June 12, 2008 | TANAKA JIRO | --- | RESERVED |
| FRANCHISE HOTEL B | SINGLE | June 12, 2008 | SATO TARO | --- | RESERVED |
| FRANCHISE HOTEL B | SINGLE | June 12, 2008 | OTA ICHIRO | --- | RESERVED |
| ... | | | | | .. | vacant ROOM INFORMATION DB 132

| HOTEL NAME | ROOM TYPE | SCHEDULED LODGING DATE | ... | REMAINING ROOMS |
|---|---|---|---|---|
| FRANCHISE HOTEL A | SINGLE | June 10, 2008 | --- | 25 |
| FRANCHISE HOTEL A | DOUBLE | June 10, 2008 | --- | 33 |
| FRANCHISE HOTEL A | DOUBLE | June 11, 2008 | --- | 18 |
| FRANCHISE HOTEL B | DOUBLE | June 12, 2008 | --- | 21 |
| ... | | | | .. |

B. AFTER UPDATE OF RESERVATION INFORMATION

RESERVATION INFORMATION DB 131

| HOTEL NAME | ROOM TYPE | LODGING DATE | SUBSCRIBER | ... | STATUS |
|---|---|---|---|---|---|
| FRANCHISE HOTEL A | SINGLE | June 10, 2008 | YAMADA TARO | --- | RESERVED |
| FRANCHISE HOTEL A | DOUBLE | June 11, 2008 | SUZUKI HANAKO | --- | RESERVED |
| FRANCHISE HOTEL A | SINGLE | June 12, 2008 | TANAKA JIRO | --- | RESERVED |
| FRANCHISE HOTEL B | SINGLE | June 12, 2008 | SATO TARO | --- | RESERVED |
| FRANCHISE HOTEL B | SINGLE | June 12, 2008 | OTA ICHIRO | --- | RESERVED |
| ... | | | | | .. | vacant ROOM INFORMATION DB 132

| HOTEL NAME | ROOM TYPE | SCHEDULED LODGING DATE | ... | REMAINING ROOMS |
|---|---|---|---|---|
| FRANCHISE HOTEL A | SINGLE | June 10, 2008 | --- | 24 |
| FRANCHISE HOTEL A | DOUBLE | June 10, 2008 | --- | 33 |
| FRANCHISE HOTEL A | DOUBLE | June 11, 2008 | --- | 18 |
| FRANCHISE HOTEL B | DOUBLE | June 12, 2008 | --- | 21 |
| ... | | | | .. |

FIG. 21

PERSONAL INFORMATION CHECKING
SCREEN OF USER TERMINAL 4
(DISPLAY LODGING RESERVATION
SITE SERVER 3)

| | |
|---|---|
| USER ID | XXXXX |
| PASSWORD | X,XXXX |
| : | : |

FIG. 22

RESERVATION CANCELLATION SCREEN
OF USER TERMINAL 4
(DISPLAY FRANCHISE HOTEL
MANAGEMENT SERVER 10)

| RESERVATION DATE | LODGING DATE | HOTEL NAME | - - | |
|---|---|---|---|---|
| XXXX | XXXX | XXXX | - - | CANCELLED |
| XXXX | XXXX | XXXX | - - | CANCELLED |
| | : | | | |

RESERVATION CANCELLATION RESULT SCREEN OF USER TERMINAL 4 (DISPLAY LODGING RESERVATION SITE SERVER 3)

FIG. 24

MODIFICATION OF DATA BY RESERVATION CANCELLATION
(SERVER 2 OF FRANCHISE HOTEL A)

A. BEFORE RESERVATION CANCELLATION

RESERVATION INFORMATION DB 231

| HOTEL NAME | ROOM TYPE | LODGING DATE | SUBSCRIBER | ... | STATUS |
|---|---|---|---|---|---|
| FRANCHISE HOTEL A | SINGLE | June 10, 2008 | YAMADA TARO | ... | RESERVED |
| FRANCHISE HOTEL A | DOUBLE | June 11, 2008 | SUZUKI HANAKO | ... | RESERVED |
| FRANCHISE HOTEL A | SINGLE | June 12, 2008 | TANAKA JIRO | ... | RESERVED |
| ... | ... | ... | ... | ... | ... | vacant ROOM INFORMATION DB 232

| HOTEL NAME | ROOM TYPE | SCHEDULED LODGING DATE | ... | REMAINING ROOMS |
|---|---|---|---|---|
| FRANCHISE HOTEL A | SINGLE | June 10, 2008 | ... | 24 |
| FRANCHISE HOTEL A | DOUBLE | June 10, 2008 | ... | 33 |
| FRANCHISE HOTEL A | DOUBLE | June 12, 2008 | ... | 18 |
| ... | ... | ... | ... | ... |

B. AFTER RESERVATION CANCELLATION

RESERVATION INFORMATION DB 231

| HOTEL NAME | ROOM TYPE | LODGING DATE | SUBSCRIBER | ... | STATUS |
|---|---|---|---|---|---|
| FRANCHISE HOTEL A | SINGLE | June 10, 2008 | YAMADA TARO | ... | CANCELLED |
| FRANCHISE HOTEL A | DOUBLE | June 11, 2008 | SUZUKI HANAKO | ... | RESERVED |
| FRANCHISE HOTEL A | SINGLE | June 12, 2008 | TANAKA JIRO | ... | RESERVED |
| ... | ... | ... | ... | ... | ... | vacant ROOM INFORMATION DB 232

| HOTEL NAME | ROOM TYPE | SCHEDULED LODGING DATE | ... | REMAINING ROOMS |
|---|---|---|---|---|
| FRANCHISE HOTEL A | SINGLE | June 10, 2008 | ... | 25 |
| FRANCHISE HOTEL A | DOUBLE | June 10, 2008 | ... | 33 |
| FRANCHISE HOTEL A | DOUBLE | June 12, 2008 | ... | 18 |
| ... | ... | ... | ... | ... |

FIG. 25

MODIFICATION OF DATA BY UPDATING RESERVATION CANCELLATION INFORMATION
(FRANCHISE HOTEL MANAGEMENT SERVER 10)

A. BEFORE RESERVATION CANCELLATION

RESERVATION INFORMATION DB 131

| HOTEL NAME | ROOM TYPE | LODGING DATE | SUBSCRIBER | ... | STATUS |
|---|---|---|---|---|---|
| FRANCHISE HOTEL A | SINGLE | June 10, 2008 | YAMADA TARO | ... | RESERVED |
| FRANCHISE HOTEL A | DOUBLE | June 11, 2008 | SUZUKI HANAKO | ... | RESERVED |
| FRANCHISE HOTEL A | SINGLE | June 12, 2008 | TANAKA JIRO | ... | RESERVED |
| FRANCHISE HOTEL B | SINGLE | June 12, 2008 | SATO TARO | ... | RESERVED |
| FRANCHISE HOTEL B | SINGLE | June 12, 2008 | OTA ICHIRO | ... | RESERVED |
| ... | ... | ... | ... | ... | ... | vacant ROOM INFORMATION DB 132

| HOTEL NAME | ROOM TYPE | SCHEDULED LODGING DATE | ... | REMAINING ROOMS |
|---|---|---|---|---|
| FRANCHISE HOTEL A | SINGLE | June 10, 2008 | ... | 24 |
| FRANCHISE HOTEL A | DOUBLE | June 10, 2008 | ... | 33 |
| FRANCHISE HOTEL A | DOUBLE | June 11, 2008 | ... | 18 |
| FRANCHISE HOTEL B | DOUBLE | June 12, 2008 | ... | 21 |
| ... | ... | ... | ... | ... |

B. AFTER RESERVATION CANCELLATION

RESERVATION INFORMATION DB 131

| HOTEL NAME | ROOM TYPE | LODGING DATE | SUBSCRIBER | ... | STATUS |
|---|---|---|---|---|---|
| FRANCHISE HOTEL A | SINGLE | June 10, 2008 | YAMADA TARO | ... | CANCELLED |
| FRANCHISE HOTEL A | DOUBLE | June 11, 2008 | SUZUKI HANAKO | ... | RESERVED |
| FRANCHISE HOTEL A | SINGLE | June 12, 2008 | TANAKA JIRO | ... | RESERVED |
| FRANCHISE HOTEL B | SINGLE | June 12, 2008 | SATO TARO | ... | RESERVED |
| FRANCHISE HOTEL B | SINGLE | June 12, 2008 | OTA ICHIRO | ... | RESERVED |
| ... | ... | ... | ... | ... | ... | vacant ROOM INFORMATION DB 132

| HOTEL NAME | ROOM TYPE | SCHEDULED LODGING DATE | ... | REMAINING ROOMS |
|---|---|---|---|---|
| FRANCHISE HOTEL A | SINGLE | June 10, 2008 | ... | 25 |
| FRANCHISE HOTEL A | DOUBLE | June 10, 2008 | ... | 33 |
| FRANCHISE HOTEL A | DOUBLE | June 11, 2008 | ... | 18 |
| FRANCHISE HOTEL B | DOUBLE | June 12, 2008 | ... | 21 |
| ... | ... | ... | ... | ... |

FIG. 28

EXAMPLE OF DATABASE OF
LODGING RESERVATION SITE SERVER 3 vacant ROOM INFORMATION DB 332

| HOTEL NAME | ROOM TYPE | SCHEDULED LODGING DATE | ALLOTTED NO. | REMAINING ROOMS | |
|---|---|---|---|---|---|
| HOTEL XXX | SINGLE | DD/MM | 10 | 4 | ... |
| FRANCHISE HOTEL A | DOUBLE | DD/MM | — | 15 | ... |
| HOTEL XXX | SINGLE | DD/MM | 5 | 3 | ... |
| HOTEL XXX | DOUBLE | DD/MM | 10 | 6 | ... |
| FRANCHISE HOTEL B | SINGLE | DD/MM | — | 25 | ... |
| ⋮ | ⋮ | ⋮ | ⋮ | ⋮ | |

FIG. 29

EXAMPLE OF DATABASE OF
LODGING RESERVATION SITE SERVER 3

HOTEL INFORMATION DB 333

| HOTEL NAME | LOCATION | ROOM TYPE | ROOM CHARGE | SCHEDULED LODGING DATE REFERRING LOCATION | |
|---|---|---|---|---|---|
| HOTEL XXX | TOKYO | SINGLE | OOO YEN | REFER VACANT ROOM INFORMATION DB 332 | ... |
| HOTEL XXX | OSAKA | DOUBLE | OOO YEN | REFER VACANT ROOM INFORMATION DB 332 | ... |
| FRANCHISE HOTEL A | SHINJUKU | SINGLE | OOO YEN | REFER VACANT ROOM INFORMATION DB 332 | ... |
| HOTEL XXX | YOKOHAMA | SINGLE | OOO YEN | REFER VACANT ROOM INFORMATION DB 332 | ... |
| ⋮ | ⋮ | ⋮ | ⋮ | ⋮ | |

FIG. 30

OPTION SEARCH WORK TABLE

| HOTEL NAME | ROOM TYPE | RESERVATION DATE | ROOM CHARGE | SCHEDULED LODGING DATE | VACANT ROOM | |
|---|---|---|---|---|---|---|
| HOTEL XXX | SINGLE | DD/MM | OOO YEN | REFER VACANT ROOM DB 332 | YES | ... |
| FRANCHISE HOTEL A | SINGLE | DD/MM | OOO YEN | REFER VACANT ROOM DB 332 | NO | ... |
| HOTEL XXX | DOUBLE | DD/MM | OOO YEN | REFER VACANT ROOM DB 332 | YES | ... |
| FRANCHISE HOTEL B | SINGLE | DD/MM | OOO YEN | REFER VACANT ROOM DB 332 | YES | ... |
| HOTEL XXX | SINGLE | DD/MM | OOO YEN | REFER VACANT ROOM DB 332 | NO | ... |
| ⋮ | ⋮ | ⋮ | ⋮ | ⋮ | ⋮ | |

FIG. 32

RESERVATION INFORMATION
INPUT SCREEN OF USER TERMINAL 4
(DISPLAY LODGING
RESERVATION SITE SERVER 3)

| | |
|---|---|
| NAME OF SUBSCRIBER | XXXXX |
| NAME OF LODGER | XXXXX |
| TELEPHONE NO. | XXXXX |
| HOTEL NAME | XXXXX |
| : | |

FIG. 34

MODIFICATION OF DATA BY RESERVATION REGISTRATION
(LODGING RESERVATION SITE SERVER 3)

A. BEFORE RESERVATION REGISTRATION

RESERVATION INFORMATION DB 331

| SERIAL NO. | HOTEL NAME | ROOM TYPE | LODGING DATE | SUBSCRIBER | ... | STATUS |
|---|---|---|---|---|---|---|
| 0000 | HOTEL A | DOUBLE | June 11, 2008 | SUZUKI HANAKO | -- | RESERVED |
| 0000 | FRANCHISE HOTEL A | SINGLE | June 12, 2008 | TANAKA JIRO | -- | RESERVED |
| ... | ... | ... | ... | ... | .. | ... | vacant ROOM INFORMATION DB 332

| HOTEL NAME | ROOM TYPE | SCHEDULED LODGING DATE | ... | ALLOTTED NO. | STATUS |
|---|---|---|---|---|---|
| FRANCHISE HOTEL A | SINGLE | June 10, 2008 | -- | - | 25 |
| HOTEL A | DOUBLE | June 10, 2008 | -- | 40 | 33 |
| HOTEL A | DOUBLE | June 12, 2008 | -- | 30 | 18 |
| ... | ... | ... | .. | | ... |

B. AFTER RESERVATION CANCELLATION

RESERVATION INFORMATION DB 331

| SERIAL NO. | HOTEL NAME | ROOM TYPE | LODGING DATE | SUBSCRIBER | ... | STATUS |
|---|---|---|---|---|---|---|
| 0000 | FRANCHISE HOTEL A | SINGLE | June 10, 2008 | YAMADA TARO | -- | RESERVED |
| 0000 | HOTEL A | DOUBLE | June 11, 2008 | SUZUKI HANAKO | -- | RESERVED |
| 0000 | HOTEL A | SINGLE | June 12, 2008 | TANAKA JIRO | -- | RESERVED |
| ... | ... | ... | ... | ... | .. | ... | vacant ROOM INFORMATION DB 332

| HOTEL NAME | ROOM TYPE | SCHEDULED LODGING DATE | ... | ALLOTTED NO. | STATUS |
|---|---|---|---|---|---|
| FRANCHISE HOTEL A | SINGLE | June 10, 2008 | -- | - | 24 |
| HOTEL A | DOUBLE | June 10, 2008 | -- | 40 | 33 |
| HOTEL A | DOUBLE | June 12, 2008 | -- | 30 | 18 |
| ... | ... | ... | .. | | ... |

FIG. 37

RESERVATION CANCELLATION SCREEN OF USER TERMINAL 4
(DISPLAY LODGING RESERVATION SITE SERVER 3)

| RESERVATION DATE | LODGING DATE | HOTEL NAME | — — | |
|---|---|---|---|---|
| XXXX | XXXXX | XXXXX | — — | CANCELLED |
| XXXX | XXXXX | XXXXX | — — | CANCELLED |
| | : | | | |

FIG. 38

MODIFICATION OF DATA BY RESERVATION CANCELLATION (LODGING RESERVATION SITE SERVER 3)

A. BEFORE RESERVATION REGISTRATION

RESERVATION INFORMATION DB 331

| SERIAL NO. | HOTEL NAME | ROOM TYPE | LODGING DATE | SUBSCRIBER | ... | STATUS |
|---|---|---|---|---|---|---|
| 0000 | FRANCHISE HOTEL A | SINGLE | June 10, 2008 | YAMADA TARO | ... | RESERVED |
| 0000 | FRANCHISE HOTEL A | DOUBLE | June 11, 2008 | SUZUKI HANAKO | ... | RESERVED |
| 0000 | HOTEL A | SINGLE | June 12, 2008 | TANAKA JIRO | ... | RESERVED |
| ... | ... | ... | ... | ... | ... | ... | vacant ROOM INFORMATION DB 332

| HOTEL NAME | ROOM TYPE | SCHEDULED LODGING DATE | ... | ALLOTTED NO. | REMAINING ROOMS |
|---|---|---|---|---|---|
| FRANCHISE HOTEL A | SINGLE | June 10, 2008 | ... | - | 24 |
| HOTEL A | DOUBLE | June 10, 2008 | ... | 40 | 33 |
| HOTEL A | DOUBLE | June 12, 2008 | ... | 30 | 18 |
| ... | ... | ... | ... | ... | ... |

B. AFTER RESERVATION CANCELLATION

RESERVATION INFORMATION DB 331

| SERIAL NO. | HOTEL NAME | ROOM TYPE | LODGING DATE | SUBSCRIBER | ... | STATUS |
|---|---|---|---|---|---|---|
| 0000 | FRANCHISE HOTEL A | SINGLE | June 10, 2008 | YAMADA TARO | ... | CANCELLED |
| 0000 | FRANCHISE HOTEL A | DOUBLE | June 11, 2008 | SUZUKI HANAKO | ... | RESERVED |
| 0000 | HOTEL A | SINGLE | June 12, 2008 | TANAKA JIRO | ... | RESERVED |
| ... | ... | ... | ... | ... | ... | ... | vacant ROOM INFORMATION DB 332

| HOTEL NAME | ROOM TYPE | SCHEDULED LODGING DATE | ... | ALLOTTED NO. | REMAINING ROOMS |
|---|---|---|---|---|---|
| FRANCHISE HOTEL A | SINGLE | June 10, 2008 | ... | - | 25 |
| HOTEL A | DOUBLE | June 10, 2008 | ... | 40 | 33 |
| HOTEL A | DOUBLE | June 12, 2008 | ... | 30 | 18 |
| ... | ... | ... | ... | ... | ... |

FIG. 40

REMAINING ROOM MANAGEMENT TABLE 134

HOTEL ID : x x x x        NUMBER OF LODGING RESERVATION SITE ID : n

| LODGING RESERVATION SITE ID | ALLOTTED NO | REFERENCE NO. OF REMAINING ROOMS b | NO. OF REMAINING ROOMS a | DIFFERENCE | INCREMENT OF ALLOTTED NO. c |
|---|---|---|---|---|---|
| ID x x x 1 | 30 | 8 | 10 | 2 | −1 |
| ID x x x 2 | 20 | 5 | 2 | −3 | +4 |
| ⋮ | ⋮ | ⋮ | ⋮ | ⋮ | ⋮ |
| SUM | 200 | 20 | 30 | 10 | 0 |

RESERVATION CLOSING TIME: ○○HR △△MIN

LIMIT TIME: XXMIN

RESERVATION SYSTEM

TECHNICAL FIELD

The present invention relates to a reservation system used as a reservation service for lodging accommodations performed through a communication network.

BACKGROUND ART

An existing reservation site of a travel agency for reserving lodge at a hotel through Internet registers information on the number of vacant rooms allotted from hotels to be reserved to the travel agency system and takes reservations for lodge within the number of the assigned vacant rooms.

For these reasons, there are proposed a lodging reservation system for registering only lodging reservation according to a demand from a user terminal and for updating status of vacant rooms in databases of accommodations, a reservation registering device, and a programming technology for processing reservation register (refer to Patent Document 1).

Patent document 1: Japanese Unexamined Patent Application Publication No. 2008-26987

SUMMARY OF THE INVENTION

Problem to be Solved by the Invention

Since the number of rooms of respective hotels (the number of rooms in charge to be reserved) allotted to each of lodging reservation sites is limited, when users gather to a specific site, the users cannot reserve vacant rooms in the specific site despite of other sites having vacant rooms.

There has been a problem that when the reservation is cancelled, each of hotels cannot promptly reflect the cancellation to the lodging reservation site.

Meanwhile, this problem does not occur in all hotels and it needs to make easy selection of reservation method at hotels. However, the patent document 1 neither discloses the reservation method in detail nor solves the above problem.

The present invention has been made in view of the above problem, and the object of the present invention is to provide a reservation system for managing remaining vacant rooms in all reservation sites properly while maintaining a chance of request for reservation for accommodations even when users gather to a specific reservation site.

Means for Solving Problems

In accordance with the aspects of the present invention, a reservation system for performing reservations of a user at a plurality of facilities, includes: a first computer performing reservations of the facilities; and a second computer accessing the first computer through a network and managing vacancy data of a predetermined specific facility. The first computer includes: an input data receiving means to display an input screen for the reservation of the respective facilities on a user terminal that accesses through the network, and to receive input data containing the facility and date that are input through the input screen when a facility different from the specific facility is inputted to the input screen; a reservation data storing means to create and store reservation data of the facility based on the input data received from the input data receiving means; and an input data transmission means to transmit the input data containing the facility and date input through the input screen to the second computer through the network when the specific facility is input to the input screen of the user terminal by the input data receiving means. The second computer includes: a vacancy data updating means to update the vacancy data based on the input data transmission means from the input data transmitter of the first computer; and a reservation completion data displaying means to create reservation completion data based on an updating record of the vacancy data, to display the reservation completion data on the user terminal, and to transmit the reservation completion data to the first computer. The reservation data storing means of the first computer creates and stores reservation data based on the reservation completion data.

Here, the term "the first computer performing reservations of the facilities" means servers of web sites of travel agencies handling the lodging reservation of a plurality of accommodations through Internet. Meanwhile, in general web sites of the travel agencies, the number of rooms of the accommodations is limited because only a preset number of rooms can be allotted for accommodation.

The term 'second computer managing vacancy data of a predetermined specific facility' means a computer managing reservation status including vacant room information of hotels, or a computer managing overall situations of respective hotels in a case of a hotel chain having a plurality of hotels.

According to the present invention, since the reservation is made by changing a computer accessing a user terminal based on a user choice or determination by the computers, the user can extend selections of accommodations while using his/her user terminal normally. Moreover, since a user can reserve a desired facility without individual inquiry to a plurality of web sites, the burden imposed on the user for making the reservations at accommodations can be reduced.

Preferably, the input data receiving means of the first computer includes: a reservation option searching means to display an input screen for options including a location of a facility to be reserved and reservation date on the user terminal, to receive optional data of the facility to be reserved that is input to the input screen, and to search for a facility satisfying the facility to be reserved, based on option data of the facility to be reserved, property data containing locations of the plurality of facilities of a corresponding computer, history data of reservations at the facility, and the vacancy data of a corresponding specific facility of the second computer that accesses through the network; and the input screen for reservations at the plurality of facilities, which is displayed on the user terminal by the input data receiving means, is created based on a searched result performed by the reservation option searching means.

According to the present invention, since the information on the vacant rooms, that is, searching objects in search option of accommodation can become real-time information, precise searched results can be obtained.

Also, according to an aspect of the present invention, in the reservation system, the second computer accesses a plurality of the first computers; in which each of the first computers includes: a database storing the number of allotted rooms and the number of remaining rooms of every facility; a remaining room number transmission means to transmit the number of remaining rooms to the second computer at a preset time before a closing time of reservation; and an allotted room number modifying means to update the number of allotted rooms and the number of remaining rooms based on increment data of the number of allotted rooms transmitted from the second computer when the increment data (which include + and − values) is received, in which the second computer comprises a remaining room number adjusting means to modify the number of allotted rooms for reservation of the first computer in every facility based on the number of remaining rooms that is transmitted from the first computer and to transmit increment data of the number of allotted rooms to the respective first computers.

When the second computer managing the vacancy data accesses to a plurality of first computers taking reservation and achieving the reservation, balance of the number of remaining rooms of the first computers is automatically adjusted and efficient reservation management can be achieved.

When a preset time before the closing time for reservations is arrived, the adjustment of the number of remaining rooms may be preferably performed. By doing so, it is possible to precisely cope with urgent request for reservation or cancellation occurring right before the closing time.

Preferably, the first computer includes: a database storing a source of obtaining the vacancy data of every facility; and a referring location changing means to change the source address of the referring location based on the number of remaining rooms of every facility.

In the present invention, the obtaining location of the vacancy data at every facility can be changed based on the number of remaining rooms. For example, when the number of remaining rooms is zero in a first computer, the location of the vacancy data is changed into the second computer to prevent a user, who accesses to the corresponding first computer, from loosing a chance of reserving facility.

Advantages

According to the present invention, even when users gather to a certain reservation site, chance of reserving at the facility is not lost and the number of remaining rooms of whole reservation sites can be properly managed. Therefore, the lodging reservation site does not need to limit the number of rooms allotted by every hotel but can increase reservations according to business activities.

Moreover, since a job of precisely determining the allotted number of rooms is eliminated from the lodging reservation site and the respective hotels, the works of persons in charge of determining the allotted number of rooms can be reduced.

BRIEF DESCRIPTION OF THE DRAWINGS

FIG. 3 is a data structure example of a reservation information database 331 of FIG. 2.

FIG. 4 is a data structure example of a vacant room information database 332 of FIG. 2.

FIG. 5 is a data structure example of a hotel information database 333 of FIG. 2.

FIG. 6 is a data structure example of a user database 331 of FIG. 2.

FIG. 7 is a data structure example of a reservation information database 131 of FIG. 2.

FIG. 8 is a data structure example of a vacant room information database 132 of FIG. 2.

FIG. 9 is a data structure example of a reservation information database 231 of FIG. 2.

FIG. 10 is a data structure example of a vacant room information database 232 of FIG. 2.

FIG. 12 shows an example of an accommodation selection screen of a user terminal 4 in the first embodiment of the present invention;

FIG. 13 shows an example of a reservation information input screen of a user terminal 4 in the first embodiment of the present invention;

FIG. 14 shows an example of a reservation completion checking screen of a user terminal 4 in the first embodiment of the present invention;

FIG. 16 shows a data structure example of an optional search work table used by a reservation option searching means 326 in searching for accommodations in the reservation system 1 according to the first embodiment of the present invention;

FIG. 17 is an explanatory diagram illustrating status of data changed by registering reservation information to a server 2 of a franchise hotel A in the reservation system 1 according to the first embodiment of the present invention;

FIG. 18 is an explanatory diagram illustrating status of data changed by registering reservation information to a franchise hotel management server 10 in the first embodiment of the present invention;

FIG. 21 shows an example of a screen for checking personal information displayed on the user terminal 4 in the first embodiment of the present invention;

FIG. 22 shows an example of a screen of a user terminal 4 for canceling reservation in the first embodiment of the present invention;

FIG. 24 is an explanatory diagram of data changed by the cancelled reservation in a server 2 of the franchise hotel A in the reservation system 1 according to the first embodiment of the present invention;

FIG. 25 is an explanatory diagram of data changed by the cancelled reservation in a franchise hotel management server 10 in the reservation system 1 according to the first embodiment of the present invention;

FIG. 28 is a data structure example of a vacant room information database 332 of a memory unit 33 of a lodging reservation site server 3 for constituting a reservation system 1 according to the second embodiment of the present invention;

FIG. 29 is a data structure example of a hotel information database 333 of the memory unit 33 of the lodging reservation site server 3 for constituting the reservation system 1 according to the second embodiment of the present invention;

FIG. 30 shows an example of an optional search work table of the lodging reservation site server 3 for constituting the reservation system 1 according to the second embodiment of the present invention;

FIG. 32 shows an example of a screen of a user terminal 4 to select accommodations according to the second embodiment of the present invention;

FIG. 34 is an explanatory diagram illustrating status of data changed by registering reservation information in a lodging reservation site server 3 of the reservation system 1 according to the second embodiment of the present invention;

FIG. 37 shows an example of a reservation cancellation screen of a user terminal 4 in the second embodiment of the present invention;

FIG. 38 is an explanatory diagram illustrating status of data changed by the cancelled reservation in the lodging reservation site server 3 in the reservation system 1 according to the second embodiment of the present invention;

FIG. 40 is a data structure example of data of remaining room management table 134 of FIG. 39;

DESCRIPTION OF PREFERRED EMBODIMENTS

First Embodiment

Hereinafter, an embodiment of the present invention is described.

Figure 1:
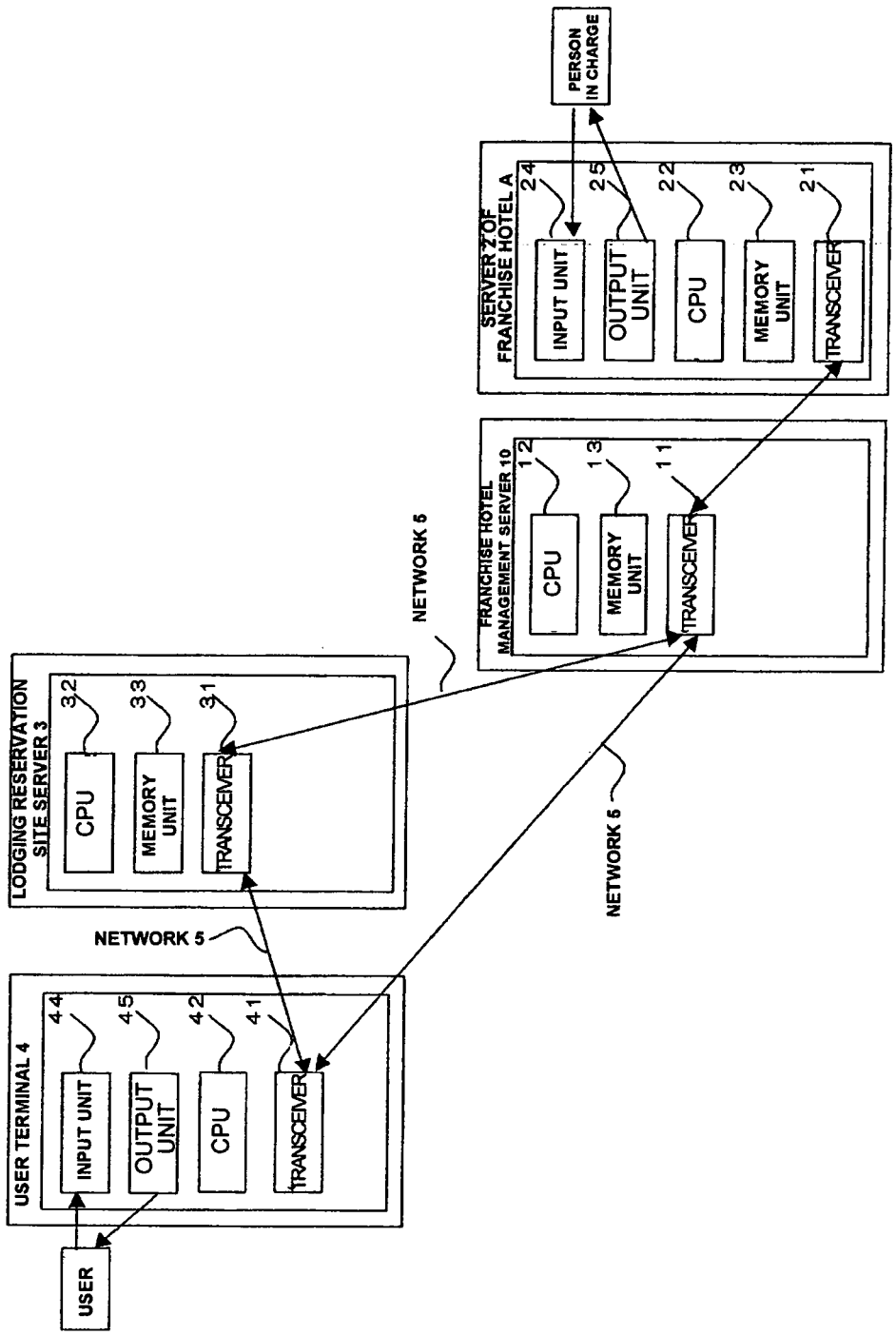
FIG. 1 is a hardware block diagram illustrating a reservation system 1 according to an embodiment of the present invention.

FIG. 1 shows an outline of relationship between respective hardware connected through a network 5 in a reservation system 1 according to this embodiment of the present invention. In this case, the communication through the network 5 is performed using a communication protocol corresponding to an electronic mail or a browser in Internet communication and a mobile phone communication network.

A user terminal 4 for making reservation for lodging at a hotel is a personal computer or a mobile phone accessible to the network 5, and in general accesses a lodging reservation site server 3 (a first computer) through a communication device (a transceiver) 41 and performs processing for lodging reservation.

The lodging reservation site server 3 manages a website for intermediately handling the lodging reservation at a plurality of accommodations, and for example, is managed by a travel agency or a mail order firm using Internet. The website is allotted the preset number of hotel rooms by negotiating with persons in charge of the respective hotels and takes the lodging reservation from users within said allotted rooms.

A franchise hotel management server (a second computer) 10 manages the lodging reservations at respective hotels (branches) in a hotel chain having a plurality of branches or a hotel group having franchise hotels joined under a certain business purpose by accessing a server 2 of a hotel A as a franchise hotel (branch) via a communication device (transceiver) 11.

Moreover, information on reservation registration and cancellation input to the server 2 of the franchise hotel A by a person in charge of the franchise hotel A is reflected to data of the franchise hotel management server 10.

In the reservation system 1 according to this embodiment, with regard to the hotels managed by the franchise hotel management server 10, a predetermined number of rooms is not allotted to the lodging reservation site server 3. Instead, the reservation agent for taking the reservations through the network 5 is changed from the lodging reservation site server 3 into the franchise hotel management server 10 as necessary when the lodging reservation is made by the user terminal 4.

Figure 2:
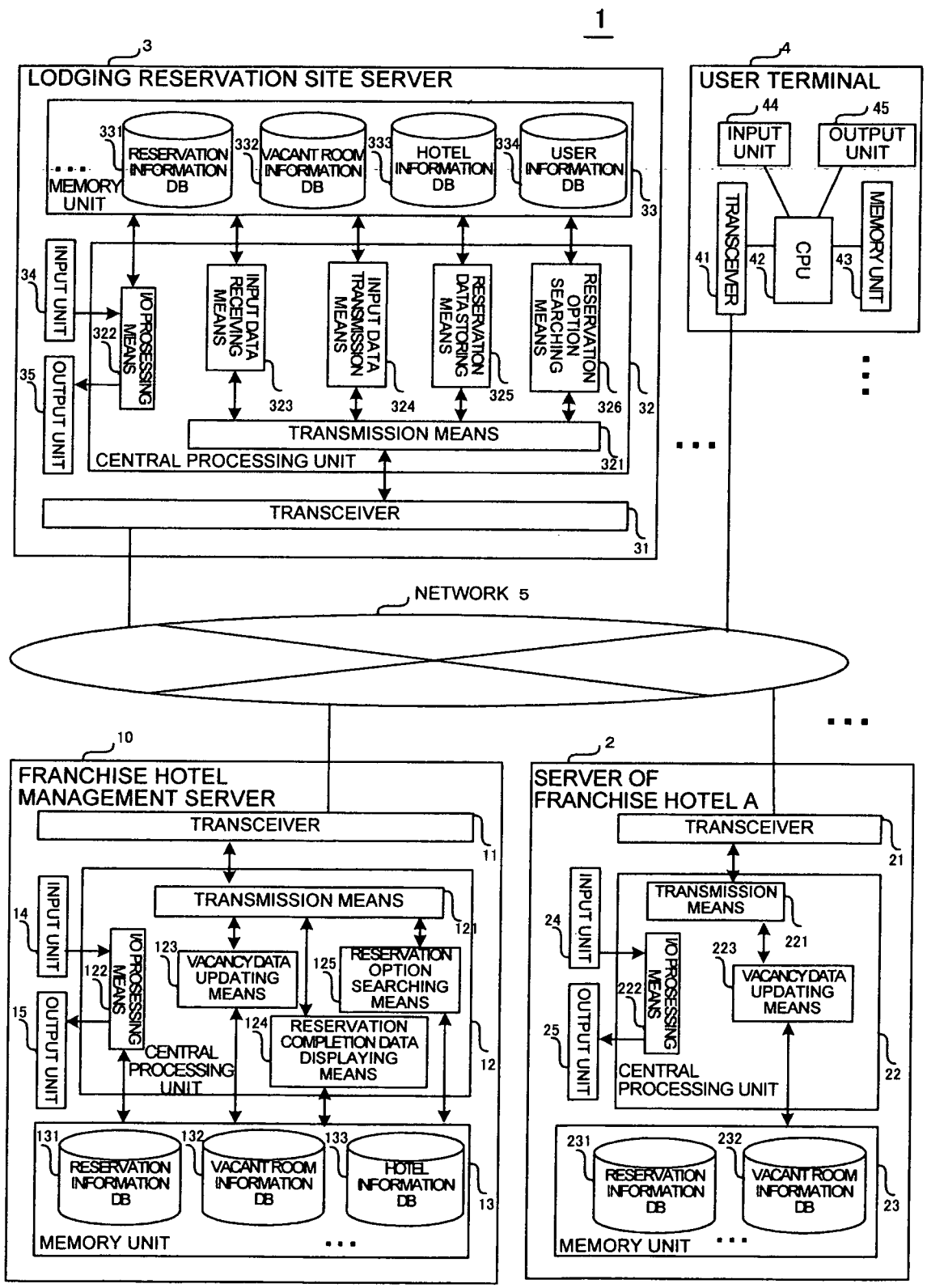
FIG. 2 is a functional block diagram of the reservation system 1 according to the embodiment of the present invention.

FIG. 2 is a functional block diagram of the reservation system 1 according to the embodiment of the present invention.

The reservation system 1 according to the embodiment of the present invention includes a lodging reservation site server 3, a user terminal 4, a franchise hotel management server 10, and a server 2 of a franchise hotel A connected with one another via network 5 such as Internet.

The lodging reservation site server 3 includes a transceiver 31 accessing the network 5, a central processing unit 32 for performing processing on the reservations, a memory unit 33 for storing information required for the reservations, an input unit 34 such as a keyboard for inputting data, and an output unit 35 for outputting data such as a printer or a display (e.g. a monitor).

The central processing unit 32 includes a transmission means 321 for exchanging data with the transceiver 31, an input and output (I/O) processing means 322 for exchanging data with the input unit 34 and the output unit 35, an input data receiving means 323 for transmitting data displayed on a screen of the user terminal 4 and for receiving data input through the display screen, an input data transmission means 324 for transmitting the input data to a preset address, a reservation data storing means 325 for storing data on the reservations by the user terminal 4, and a reservation option searching means 326 for searching for a hotel and for displaying the searched hotel on the user terminal 4 in response to a request of the user terminal 4 for searching for the hotel.

The memory unit 33 includes a reservation information database 331 containing data on reservation status and reservation detail such as subscribers who reserve hotels, a vacant room information database 332 containing data on the number of remaining rooms of respective hotels which take reservations, a hotel information database 333 containing data on locations, room types, and room charge of the respective hotels which take reservation, and a user database 334 containing data on user identifications.

FIG. 3 shows structure of the reservation information database 331 of the lodging reservation site server 3 in this embodiment of the present invention.

The reservation information database 331 contains a reservation number which is assigned with every case, and further stores a name of a hotel reserved at the lodging reservation site server 3, a room type, a lodging date, and a subscriber. The reservation information database 331, although not depicted in the drawings, contains various data required for the reservation such as reservation reception date, the number of lodgers, a name of lodger, and room charge. Moreover, the reservation information database 331 contains status information indicating status after the reservation reception.

FIG. 4 is a view illustrating structure of a vacant room information database 332 of the lodging reservation site server 3 in this embodiment of the present invention.

The vacant room information database 332 contains data of every hotel where the reservation is made by the lodging reservation site server 3, such as types of rooms, a scheduled lodging date, the number of rooms in charge that the lodging reservation site server 3 receives from the respective hotels, and the number of remaining rooms which are not reserved yet in the number of rooms in charge.

FIG. 5 shows structure of a hotel information database 333 that the lodging reservation site server 3 includes in this embodiment.

The hotel information database 333 contains data on properties of hotels where the reservations are made by the lodging reservation site server 3 including locations of the hotels, types of rooms, and room charges, and is referred by the reservation option searching means 326 when the user terminal 4 performs optional search to hotels.

The hotel reservation information database 333 further contains data on scheduled lodging date referring locations and defines the referring locations when the scheduled lodging date is selected as a search option in the optional search performed by the reservation option searching means 326. In this embodiment, since external link information on the franchise hotel A, which is managed by the franchise hotel management server 10, is input, the reservation option searching means 326 obtains the link information to search for the scheduled lodging date.

FIG. 6 shows structure of the user database 331 of the lodging reservation site server 3 in this embodiment.

The user database 334 contains information such as a user ID, a name, address, and a password of a user who uses the service provided by the lodging reservation site server 3 which is used when the lodging reservation is made, and detailed description thereof will be omitted.

The central processing unit 12 of the franchise hotel management server 10 includes a transmission means 121, an input and output device 122, a vacancy data updating means 123 for updating the data on the number of remaining rooms at the franchise hotels that the franchise hotel management server 10 manages when the number of remaining rooms is changed, a reservation completion data displaying means 124 for displaying reservation completion data of notifying the reservation is completed on the terminal of a user who made a reservation at the lodging reservation site server 3, and a reservation option searching means 125 for searching for a hotel in response to a request to search for the hotel from the lodging reservation site server 3 and for returning the searched result back to the lodging reservation site server 3.

The memory unit 13 includes, like the lodging reservation site server 3, a reservation information database 131 (FIG. 7), a vacant room information database 132 (FIG. 8), and a hotel information database 133, but the databases are different from the databases of the lodging reservation site server 3 in that the databases of the memory unit 13 contain only data of the franchise hotels that the franchise hotel management server 10 manages.

Next, structure of the server 2 of the franchise hotel A in this embodiment will be described, however, the explanation will be concentrated on only different functions, excluding the similar functions described above.

The central processing unit 22 of the server 2 of the franchise hotel A includes a transmission means 221, an input and output means 222, and a vacancy data updating means 223 for updating the data on the number of remaining rooms at the franchise hotel A when the number of remaining rooms is changed.

The memory unit 23 includes, like the lodging reservation site server 3 and the franchise hotel management server 10, a reservation information database 231 (FIG. 9) and a vacant room information database 232 (FIG. 10), but the databases are different from the databases of the lodging reservation site server 3 and the franchise hotel management server 10 in that the databases of the memory unit 23 contain only data on the franchise hotel A.

Next, the user terminal 4 will be described. The user terminal 4 may be a personal computer having a web browser or an information terminal such as a mobile phone capable of accessing various information services and includes a transceiver 41, a central processing unit 42, a memory unit 43, an input unit 44, and an output unit 45.
(Registration of Reservations)

Figure 11:
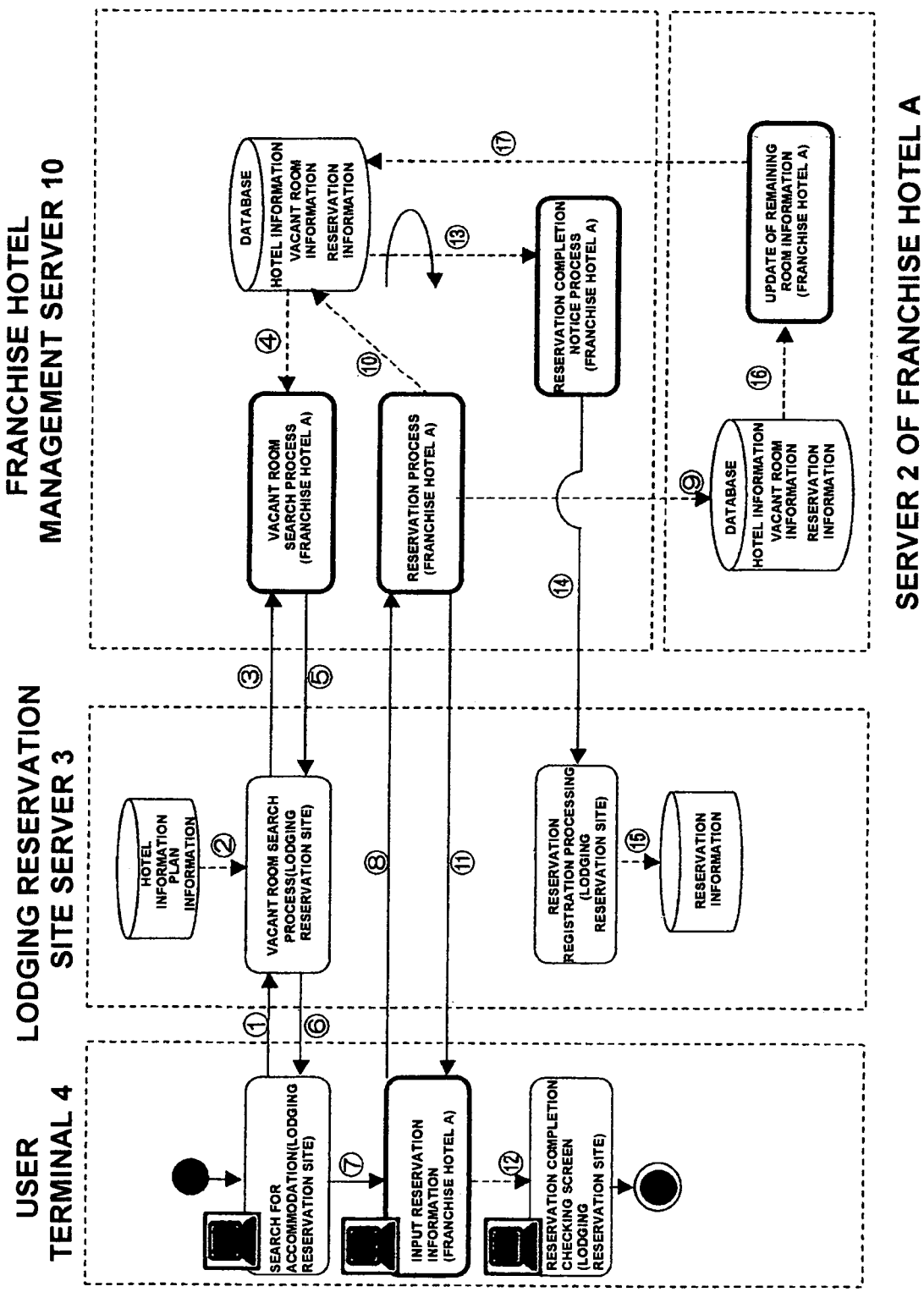
FIG. 11 is an explanatory diagram illustrating an outline when hotel reservation is taken by the reservation system 1 according to a first embodiment of the present invention.

FIG. 11 is a view illustrating an outline when hotel reservation is taken and registered by the reservation system 1 according to this embodiment of the present invention.

The user terminal 4 of a user who wants to make a reservation for a hotel accesses to the network 5 and performs the lodging search by displaying the reservation screen of the lodging reservation site server 3 thereon. In detail, the user terminal 4 inputs various options for a hotel that the reservation is made and a scheduled lodging date at the hotel to the reservation screen (1) (the numbers in the round bracket correspond to the numbers in circles. The rest is the same).

When the input data is received from a user, the input data receiving means 323 of the lodging reservation site server 3 executes a vacant room search process (reservation option searching means 326), which searches the hotel information database 333 to extract the hotel corresponding to the input option. The input data receiving means 323 further searches the vacant room information database 332 to extract a hotel having a vacant room (2).

When the first extracted hotels corresponding to the input option include a hotel managed by the franchise hotel management server 10, the vacant room search process (the reservation option searching means 326) accesses to the franchise hotel management server 10 through the network 5 and requests the vacant room search process (the reservation option searching means 125) to search (3). The vacant room search process (the reservation option searching means 125) responds to the request for the vacant room search to search the vacant room information database 131 and extracts hotels having vacant rooms (4).

When information on a hotel having a vacant room which is managed by the franchise hotel management server 10 is acquired (5), the vacant room search process (reservation option searching means 326) generates data for an accommodation selection screen according to information on the hotel extracted by the above-mentioned (2) and displays the data for an accommodation selection screen on a monitor of the user terminal 4 (6).

FIG. 12 shows an example of the accommodation selection screen of the user terminal 4. The user determines the hotel to be reserved based on a list of hotels matching to the option input to the accommodation search page of (1) and the room charge. The displayed items may further include an example of a map or services and photographs of hotels. In this case, the displayed items include the franchise hotel A managed by the franchise hotel management server 10 in addition to the hotel from which the lodging reservation site server 3 receives a certain number of rooms.

When the user wants to reserve the franchise hotel A and inputs a choice of reserving the franchise hotel A on the accommodation selecting screen displayed on the user terminal 4, for example, the input data transmission means 324 changes the access of the user terminal 4 to the reservation process (vacancy data updating means 123) of the franchise hotel management server 10 according to the link tag embedded in the accommodation selecting screen (7).

A reservation information input screen is displayed on the user terminal 4 by the reservation process (vacancy data updating means 123) and the user sends the input reservation information (8).

FIG. 13 shows an example of the reservation information input screen of the user terminal 4. The displayed term includes a subscriber name, a lodger name, telephone number, and a hotel name.

The reservation process (vacancy data updating means 123) which received the reservation information of the franchise hotel A registers the received reservation information to the reservation information database 231 of the server 2 of the franchise hotel A (9). The reservation process also registers the received reservation information to the reservation information database 131 of the franchise hotel management server 10 (10).

When the reservation is completed, the reservation completion data displaying means 124 transmits the reservation result to the user terminal 4 (11). When the reservation result is displayed on the user terminal 4, the reservation completion data displaying means 124 changes the connection of the user terminal 4 with the franchise hotel management server 10 into the connection with the lodging reservation site server 3 (12).

The franchise hotel management server 10 checks the reservation information of the reservation information database 131 by polling (13) and transmits the reservation information to the lodging reservation site server 3 (14).

FIG. 14 shows an example of a reservation completion checking screen of a user terminal 4. In this example, information containing a reservation number and reservation detail is displayed.

The reservation registration (reservation data storing means 325) of the lodging reservation site server 3 registers the reservation result to the reservation information database 331 (15).

Moreover, the update is performed to the server 2 of the franchise hotel A by the vacancy data updating means 223 reducing the number of remaining rooms stored in the vacant room information database 232 (16), and at the same time data of the vacant room database 132 of the franchise hotel management server 10 is updated(17).

Meanwhile, when the franchise hotel A managed by the franchise hotel management server 10 is not selected but a hotel from which the lodging reservation site server 3 receives a certain number of rooms is selected, the input data receiving means 323 updates data on the number of remaining rooms by sensing the selection of the hotel received a certain number of rooms on the accommodation selection screen, by starting the reservation registration (reservation data storing means 325), which records the lodging information input from the user terminal 4 to the reservation information database 331 of the lodging reservation site server 3 and subtracts the number of rooms from the corresponding data of the vacant room information database 332.

Figure 15:
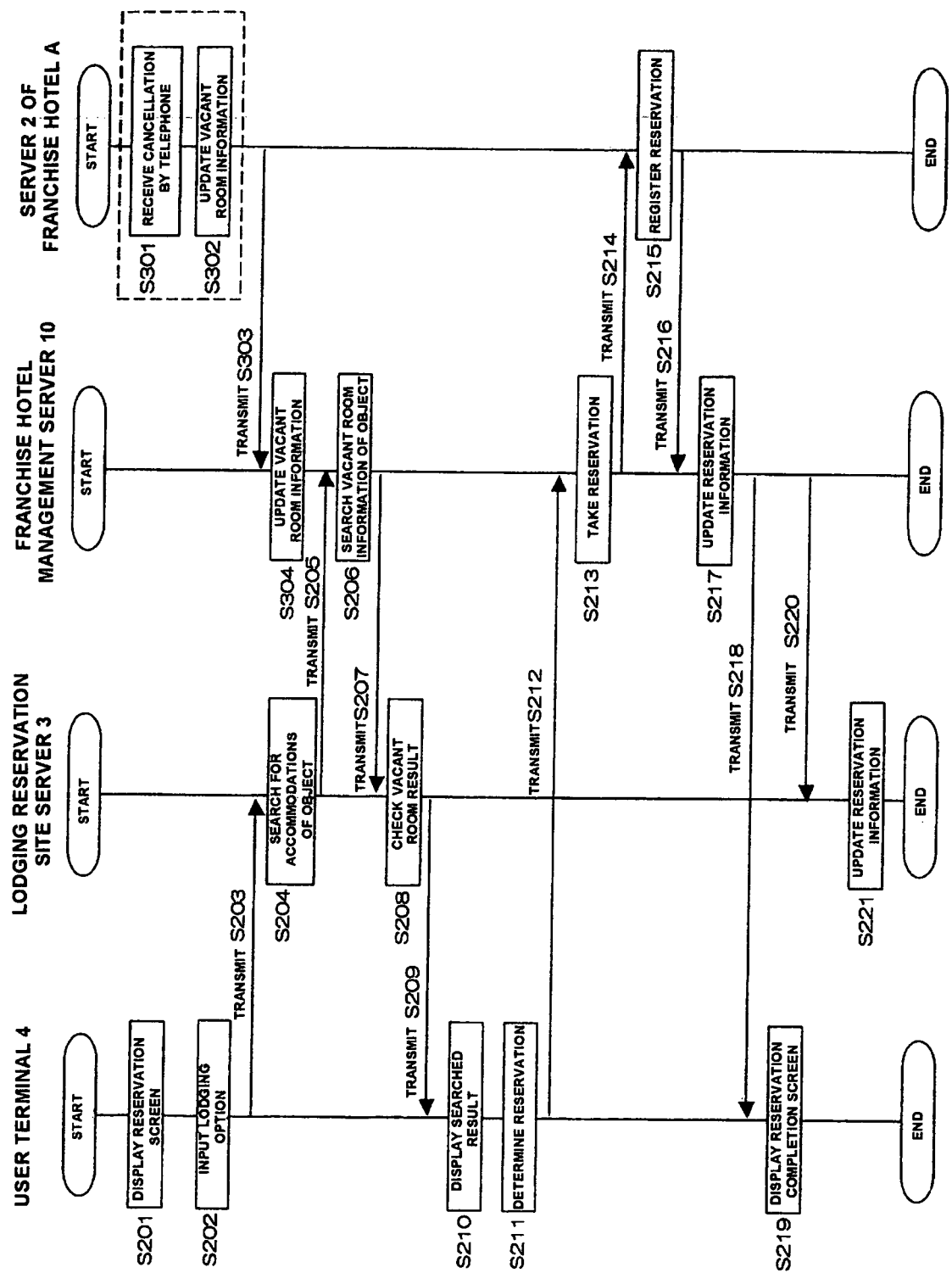
FIG. 15 is a sequence diagram illustrating a case when a franchise hotel A, managed by a franchise hotel reservation management system 10, is selected in the reservation system 1 according to the first embodiment of the present invention.

FIG. 15 is a sequence diagram illustrating a case when the franchise hotel A, managed by the franchise hotel reservation management system 10, is selected in the reservation system 1 according to the embodiment of the present invention.

First, the user displays the reservation screen of the lodging reservation site server 3 on the monitor (output unit 45) of the user terminal 4 in response to a demand (S201), inputs information such as a location where the user wishes to lodge and lodging date using a keyboard (input unit 44) of the user terminal 4 (S202), and transmits the input information to the lodging reservation site server 3 (S203).

The input data receiving means 323 of the lodging reservation site server 3 receives the data transmitted from the user terminal 4. Then the reservation option searching means 326 searches the hotel information database 333 (FIG. 5) for a corresponding hotel based on the received lodging options (S204), and at the same time transmits the lodging options to the reservation option searching means 125 of the franchise hotel management server 10 (S205).

The reservation option searching means 125 of the franchise hotel management server 10 accesses the vacant room information database 133 to check the vacant room information of a target hotel (S206) and transmits the searched result to the lodging reservation site server 3 (S207).

The lodging reservation site server 3 generates the searched result based on the vacant room information of hotels of the franchise hotel management server 10 and the vacant room information of hotels of the lodging reservation site server 3 (S208) and transmits the generated result to the user terminal 4 (S209).

FIG. 16 shows an example of an optional search work table used by a reservation option searching means 326 in searching for accommodations. The reservation option searching means 326 extracts a hotel having property such as a location matched to the lodging options requested by the user from the hotel information database 33 and temporally stores ID of the extracted hotel in the optional search work table.

The reservation option searching means 326 checks the vacant room information database 332 to determine whether there is a vacant room of the extracted hotel, which is not managed by the franchise hotel management server 10, on the scheduled lodging date, and stores the checked result.

Meanwhile, with respect to hotels managed by the franchise hotel management server 10, data on the checked result is returned to the franchise hotel management server 10 and the franchise hotel management server 10 returns the checked result of the vacant room information database 132 back to the reservation option searching means 326 of the lodging reservation site server 3.

In this case, the reservation option searching means 326 of the lodging reservation site server 3 may check directly the vacant room information database 132 as the franchise hotel management server 10 does. By doing so, the search may be simplified.

The reservation option searching means 326 generates the searched result based on data of hotels which are listed in the optional search work table and marked as already 'reserved' and displays the searched result on the monitor (output unit 45) of the user terminal 4.

As illustrated in FIG. 15, the searched result is displayed on the monitor (output unit 45) of the user terminal 4 (S210) and the user selects the franchise hotel A as a hotel that the request for reservation is made in this example (S211). A selection corresponding to the franchise hotel A is input and the input result is transmitted to the franchise hotel management server 10 by the input data transmission means 324 of the lodging reservation site server 3 (S212).

The vacancy data updating means 123 of the franchise hotel management server 10 takes a reservation (S213) and transmits the reservation completion information to the server 2 of the franchise hotel A (S214). The server 2 of the franchise hotel A updates data of the reservation information database 231 based on the received reservation information (S215).

FIG. 17 shows status of data changed by registering reservation information to the server 2 of the franchise hotel A.

In the reservation information database 231, 'B. after reservation registration,' in comparison with 'A. before reservation registration,' further includes a single data containing a room type 'single' and a lodging date 'Jun. 10, 2008'. Accordingly, the number of remaining rooms of the room type 'single' on the scheduled lodging date 'Jun. 10, 2008' is updated from '25' of 'A. before reservation registration' to '24' of 'B. after reservation registration' in the vacant room information database 232.

After the registration of the reservation information in the server 2 of the franchise hotel A, the reservation information is transmitted to the franchise hotel management server 10 (S216) such that the data of the reservation information database 131 of the franchise hotel management server 10 is updated (S217).

FIG. 18 shows status of data changed by registering reservation information to the franchise hotel management server 10.

In the reservation information database 131, 'B. after reservation registration,' in comparison with 'A. before reservation registration,' further includes a single data containing a room type 'single' and a lodging date 'Jun. 10, 2008'. Accordingly, the number of remaining rooms of the room type 'single' on the scheduled lodging date 'Jun. 10, 2008' is updated from '25' of 'A. before reservation registration' to '24' of 'B. after reservation registration' in the vacant room information database 132.

As illustrated in FIG. 15, the reservation completion data displaying means 124 of the franchise hotel management server 10 generates the reservation completion information and transmits the generated reservation completion information to the user terminal 4 (S218). The reservation completion screen is displayed on the monitor (output unit 45) of the user terminal 4 (S219)

The franchise hotel management server 10 transmits the reservation completion information to the lodging reservation site server 3 (S220) and the lodging reservation site server 3 that has received the reservation completion information updates the reservation information (S221).

Next, FIG. 15 also illustrates processing of a case when the reservation of the franchise hotel A is cancelled.

First, a request for canceling the lodging reservation at the franchise hotel A by calling is received (S301), the data of the reservation information database 231 of the server 2 of the franchise hotel A is updated and the data of the vacant room information database 232 is also updated (S302).

The updated information in the reservation information database 231 of the server 2 of the franchise hotel A is transmitted to the franchise hotel management server 10 (S303) such that the reservation information database 131 and the vacant room information database 132 of the franchise hotel management server 10 are updated (S304).

After that, when the accommodations are searched for from the user terminal 4 to the lodging reservation site server 3, the result is returned based on the updated number of remaining rooms.

(Cancellation of Reservation)

Figure 19:
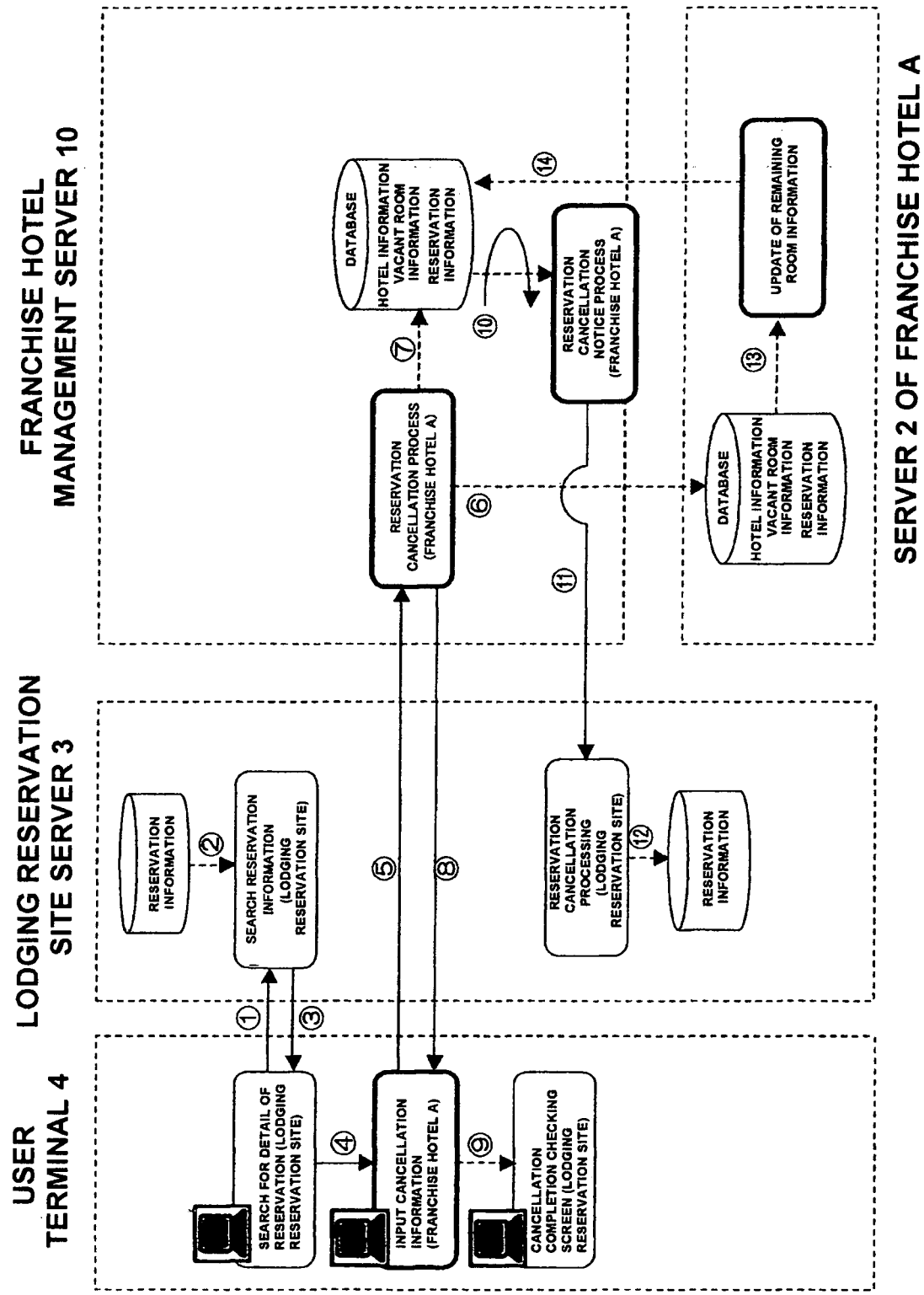
FIG. 19 is an explanatory diagram illustrating sequence of cancellation of lodging reservation in the first embodiment of the present invention.

FIG. 19 shows flow of processing cancellation in this embodiment of the present invention. When the reservation is cancelled, the cancellation is temporally shifted to the reservation screen of the franchise hotel management server 10 for the processing.

Figure 20:
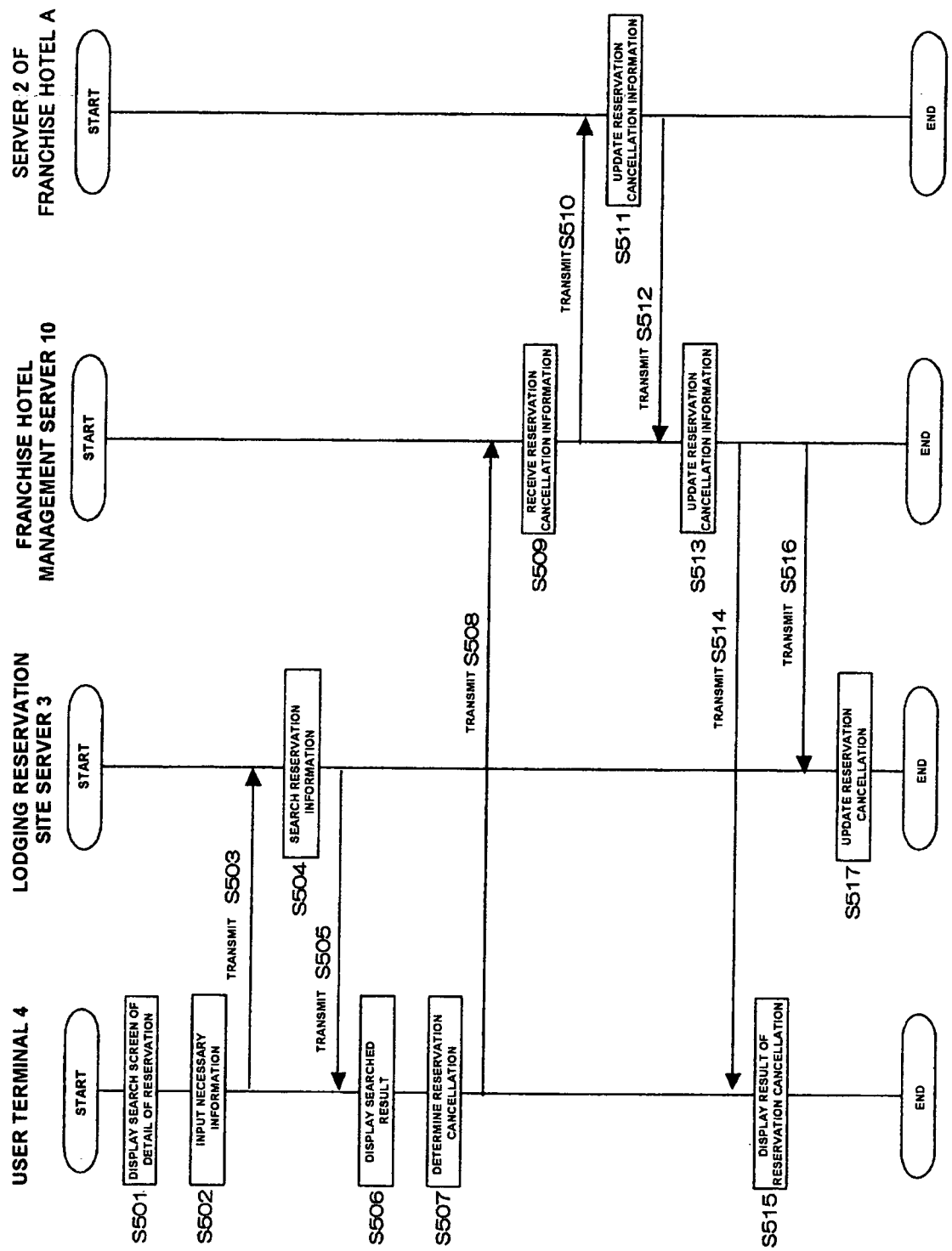
FIG. 20 is a sequence diagram illustrating the cancellation of the lodging reservation in the first embodiment of the present invention.

In the reservation system 1 according to this embodiment, the cancellation of the reservation will be described with reference to the sequence diagram illustrated in FIG. 20 in detail.

First, the user terminal 4 accesses the lodging reservation site server 3 in response to an input from the user who wants to cancel the reservation and displays a reservation detail searching screen (S501). When accessing the lodging reservation site server 3, the user inputs a user ID and a password to a personal information checking screen (FIG. 21) displayed on the user terminal 4 and the lodging reservation site server 3 compares the input data with the data in the user database 334 (FIG. 6) to authenticate the user.

The user inputs information required for searching for the reservation detail to the reservation detail searching screen displayed on the monitor (output unit 45) of the user terminal 4 (S502) and transmits the input information to the lodging reservation site server 3 (S503).

The lodging reservation site server 3 searches the reservation information database 331 (FIG. 3) based on the user ID and the input reservation detail searching information (S504). Next, the lodging reservation site server 3 generates data on the reservation cancellation screen based on the searched result and transmits the generated result to the user terminal 4 (S505). In this case, the reservation information at the franchise hotel A managed by the franchise hotel management server 10 is linked to the franchise hotel management server 10.

The reservation cancellation screen is displayed as the searched result on the monitor (output unit 45) of the user terminal 4 (S506). FIG. 22 shows an example of the reservation cancellation screen. In this embodiment, information such as a date when the reservation is made, the scheduled lodging date, and a hotel name is displayed.

When the user determines the cancellation for the reservation at the franchise hotel A managed by the franchise hotel management server 10 and inputs his/her decision to the reservation cancellation screen (S507), the reservation cancellation information is transmitted to the franchise hotel management server 10 (S508). The franchise hotel management server 10 receives the reservation cancellation information (S509) and transmits the same to the server 2 of the franchise hotel A (S510).

The server 2 of the franchise hotel A updates the reservation information database 231 (S511) and transmits the updated information to the franchise hotel management server 10 (S512).

The franchise hotel management server 10 updates the reservation information database 131 (S513), generates data of a reservation cancellation result screen displaying the result of the reservation cancellation based on the updated information, and transmits the generated data to the user terminal 4 (S514).

Figure 23:
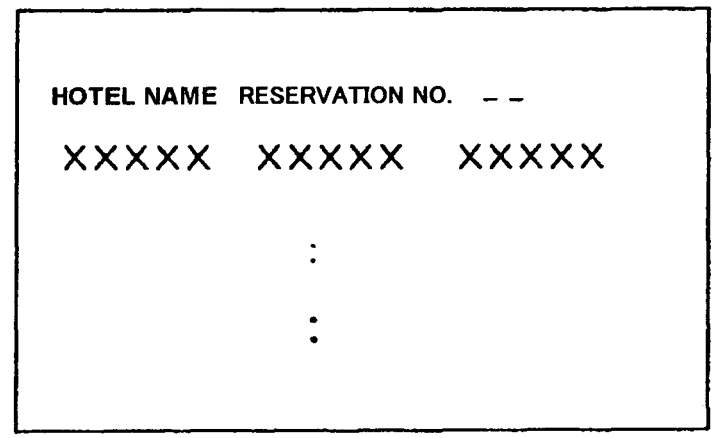
FIG. 23 shows an example of a screen of the user terminal 4 for displaying the result of the cancelled reservation in the first embodiment of the present invention.

The reservation cancellation result screen is displayed on the monitor (output unit 45) of the user terminal 4 (S515). FIG. 23 shows an example of reservation cancellation result screen. In this example, information such as hotel name and a reservation number is displayed.

The franchise hotel management server 10 transmits the reservation cancellation information to the lodging reservation site server 3 (S516). The lodging reservation site server 3 updates the information in the reservation information database 331 based on the received reservation cancellation information (S517).

FIG. 24 shows status of data changed by canceling the reservation in the server 2 of the franchise hotel A.

In the reservation information database 231, 'B. after reservation registration,' in comparison with 'A. before reservation registration,' the status is changed from 'reserved' into 'cancelled' on the data containing a room type 'single' and a lodging date 'Jun. 10, 2008'. From this, the number of remaining rooms of the room type 'single' on the scheduled lodging date 'Jun. 10, 2008' is updated from '24' of 'A. before reservation registration' to '25' of 'B. after reservation registration' in the vacant room information database 232.

FIG. 25 shows status of data changed by canceling the reservation in the franchise hotel management server 10.

In the reservation information database 131, 'B. after reservation registration,' in comparison with 'A. before reservation registration,' the status is changed from 'reserved' to 'cancelled' on the data containing a room type 'single' with a lodging date 'Jun. 10, 2008'. Accordingly, the number of remaining rooms of the room type 'single' on the scheduled lodging date 'Jun. 10, 2008' is updated from '24' of 'A. before reservation registration' to '25' of 'B. after reservation registration' in the vacant room information database 132.

(Update of Hotel Information)

Next, update of the hotel information database 333 of the lodging reservation site server 3 when the properties of hotels managed by the franchise hotel management server 10 are changed will be described.

Figure 26:
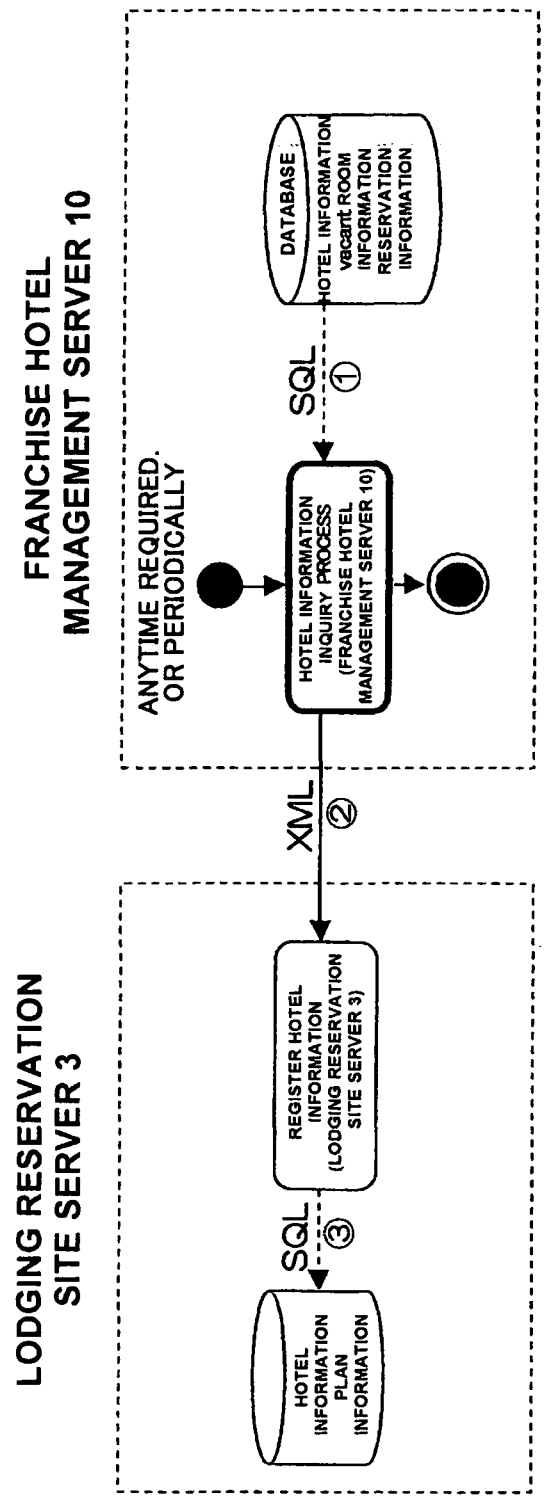
FIG. 26 is an explanatory diagram illustrating processing of updating hotel information in the first embodiment of the present invention.

FIG. 26 is a diagram illustrating the update of the hotel information.

When records of the hotel information database 133 of the server 2 of the franchise hotel A are added and/or modified, SQL data is output (1). When data such as addition and/or modification of the hotel information is acquired, a hotel information inquiry process of the server 2 of the franchise hotel A transmits the acquired data to the lodging reservation site server 3 frequently or periodically (2). The SQL data is converted to XML data and is transmitted to the lodging reservation site server 3. The lodging reservation site server 3 converts the received XML data back to the SQL data and updates the data of the hotel information database 333 (3).

Meanwhile, since the vacant room information of hotels is held in the franchise hotel management server 10, the hotel information database 333 does not contain the corresponding information.

Figure 27:
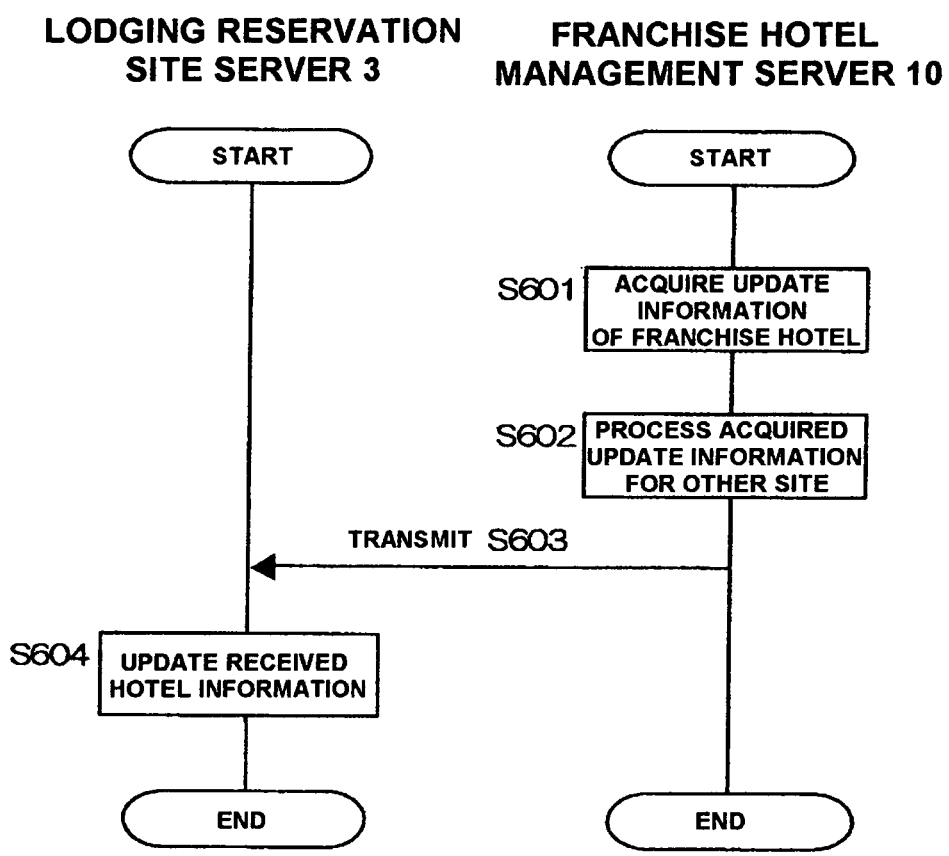
FIG. 27 is a sequence diagram illustrating the updating of hotel information in the reservation system 1 according to the first embodiment of the present invention.

FIG. 27 is a sequence diagram illustrating the updating of the hotel information.

When properties of the franchise hotel A such as the room types and/or the room charges changed, changed information is input to the hotel information database 133 of the server 2 of the franchise hotel A. The franchise hotel management server 10 acquires the changed information from the server 2 of the franchise hotel A (S601), processes the acquired changed information (S602), and transmits the processed data to the lodging reservation site server 3 (S603). The lodging reservation site server 3 updates the hotel information database 333 (FIG. 5) based on the received data.

The lodging reservation site server 3 may be set to update directly the hotel information database 333 of the lodging reservation site server 3 by adjusting an interface with the lodging reservation site server 3.

Effect of this Embodiment

As described above, according to the reservation system 1 of this embodiment, since merit of the lodging reservation site (server 3) having a large number of users and merit of the franchise hotel management server 10 providing services promptly and reliably are united for users, users may enjoy merits of the lodging reservation site (server 3) and the franchise hotel management server 10, do not need to wander a plurality of web sites, and can be provided with one-stop service.

Moreover, although some hotels might not have an electronic reservation system, since a reservation method may be selected by selecting respective hotels in the reservation system 1 of the present invention, it is possible to operate a reservation site with a high degree of freedom.

Although the franchise hotel management server 10 and the server 2 of the franchise hotel A respectively include databases in this embodiment, the reservation system 1 of the present invention can be applied to even a case where the database of the franchise hotel management server 10 is unitarily managed and the server 2 of the franchise hotel A changes only its own database. In this case, since all processing is performed in the franchise hotel management server 10, the reservation system may be more simplified.

Second Embodiment

Next, a reservation system according to a second embodiment of the present invention will be described. In the first embodiment, when the user terminal 4 makes the reservation by searching for a hotel having a vacant room, the vacant room of a hotel which can allot vacant rooms in advance is determined based on the data of the vacant room information database 332 of the lodging reservation site server 3 and the vacant room of the franchise hotel A, which is managed by the franchise hotel management server 10, is determined based on the data of the vacant room information database 132 of the franchise hotel management server 10. However, the reservation system according to this embodiment is different from that of the first embodiment in view of determining even the vacant room of the franchise hotel A managed by the franchise hotel management server 10 based on the data of the vacant room information database 332 of the lodging reservation site server 3.

In more detail, even in the second embodiment, the reservation registration at the franchise hotel A that is managed by the franchise hotel management server 10 is performed such that the franchise hotel management server 10 and the server 2 of the franchise hotel A manage all rooms and the vacant room information is managed using the vacant room information database 132 of the franchise hotel management server 10.

The vacant room information database 332 of the lodging reservation site server 3 includes the vacant room information of the franchise hotel A managed by the franchise hotel management server 10, but the management thereof is performed by the vacancy data updating means 123 of the franchise hotel management server 10. In other words, the data of the vacant room information database 132 of the franchise hotel management server 10 are synchronized with the data of the vacant room information database 332 of the lodging reservation site server 3 such that the number of remaining rooms is recorded to the vacant room information database 332 in the same status as a hotel can allot vacant rooms in advance.

In the first embodiment, the franchise hotel management server 10 generates various data and displays the same on the user terminal 4 when the user terminal 4 requests for reservation to the franchise hotel A managed by the franchise hotel management server 10. However, the reservation system according to the second embodiment is different from the reservation system of the first embodiment in vice that the lodging reservation site server 3 generates various data according to a standard format and displays the generated data on the user terminal 4.

FIG. 28 shows an example of a data structure of a vacant room information database 332 of a lodging reservation site server 3 in the second embodiment of the present invention. There is no data in the field of 'the number of rooms in charge' of the franchise hotel A and a franchise hotel B which are managed by the franchise hotel management server 10. Moreover, in 'hotel XXXXX' which can allot vacant rooms in advance, when a new reservation is taken, the information of the up-to-date number of remaining rooms is managed by subtracting the number of reserved rooms from the number of remaining rooms.

In hotels managed by the franchise hotel management server 10 such as the franchise hotel A, the data on the 'number of remaining rooms' is a value synchronized with the data of the vacant room information database 132 of the franchise hotel management server 10 and means the number of all remaining rooms of hotels at that time. Thus, the lodging reservation site server 3 cannot manage increase and decrease of the number of remaining rooms of the franchise hotel A and the value synchronized by the vacancy data updating means 123 of the franchise hotel management server 10 is input to the vacancy room information database 332.

FIG. 29 shows an example of data structure of a hotel information database 333 of the lodging reservation site server 3 in this embodiment of the present invention. Although the hotel information database 333 (FIG. 5) contains data on the external link locations in the field of the 'scheduled lodging date referring locations' such as the franchise hotel A in the first embodiment, the vacant room information database 332 is referred to in the second embodiment. Therefore, in a case of using an optional search work table (FIG. 30), an inquiry of whether there is a vacant room is determined by searching only the vacant room information database 332 (FIG. 28) of the lodging reservation site server 3.

(Registration of Reservations)

Figure 31:
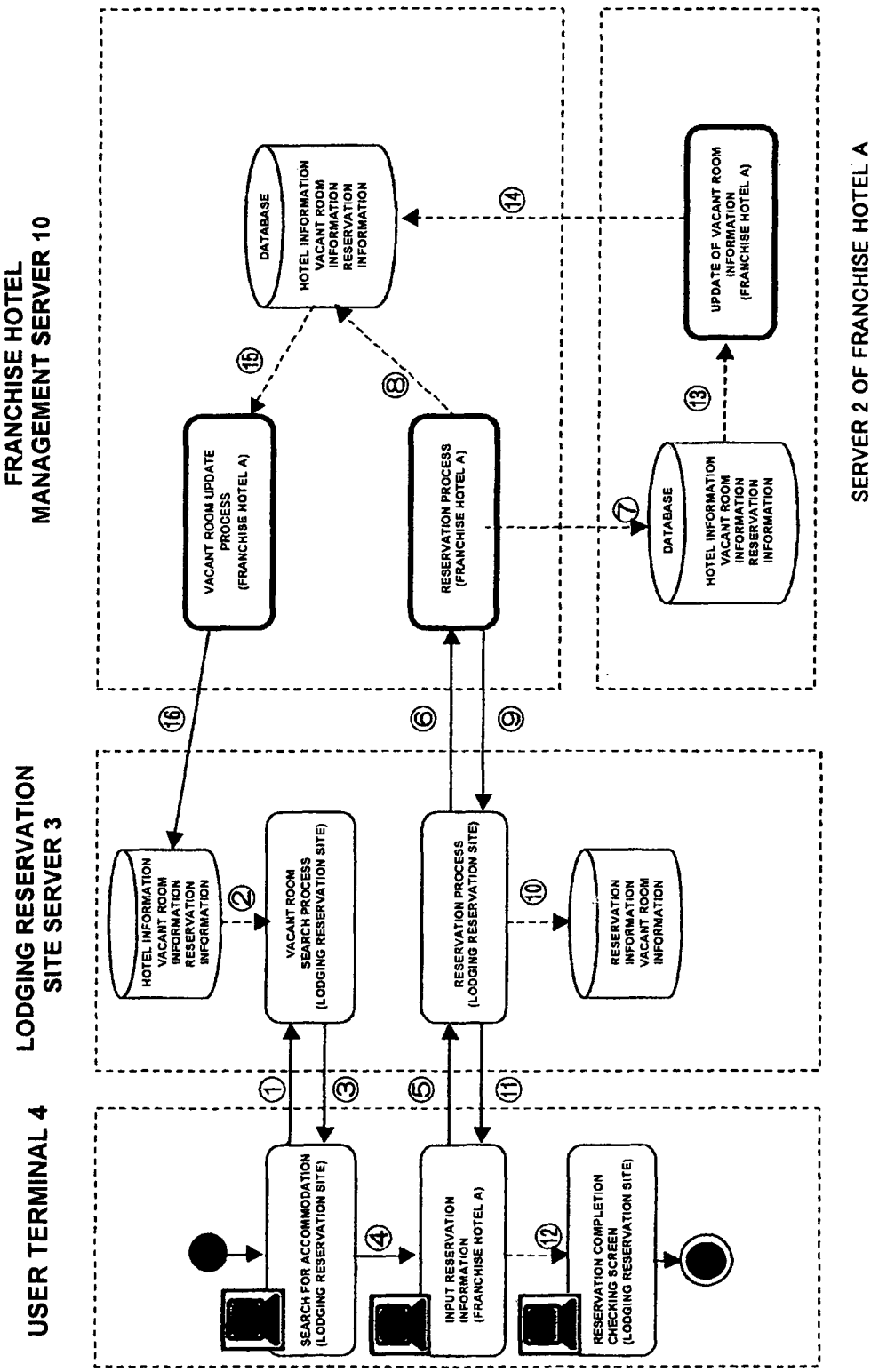
FIG. 31 is an explanatory diagram illustrating an outline when hotel reservation is made in the reservation system 1 according to the second embodiment of the present invention.

FIG. 31 is a view illustrating an outline when hotel reservation is taken and made in the reservation system 1 according to this embodiment. The difference of the reservation system 1 shown in FIG. 31 from the reservation system 1 of FIG. 11 showing the outline when the reservation registration is made in the previous embodiment will be described.

In response to an input of requesting for lodging search from the user terminal 4 (2), a vacant room search process (reservation option searching means 326) searches the vacant room information database 332 of the lodging reservation site server 3 for target accommodations (2) and displays the searched results on a monitor (output unit 45) of the user terminal 4 (3). Even in a case when the searched results for the accommodations may include the franchise hotel A managed by the franchise hotel management server 10 in this embodiment, the inquiry for the vacant room information database 132 of the franchise hotel management server 10 is not performed.

In the user terminal 4 that received the searched results, the reservation information input screen is displayed (4) after inputting a choice of a hotel at which the user wants to lodge. In this case, when the franchise hotel A managed by the franchise hotel management server 10 is selected as a result of selecting a hotel, the input data transmission means 124 of the lodging reservation site server 3, in the first embodiment, changes the access into the franchise hotel management server 10 due to a link tag embedded into the reservation information input screen. However, in the second embodiment, even when the franchise hotel A managed by the franchise hotel management server 10 is selected, the lodging reservation site server 3 displays the generated reservation information input screen (FIG. 32). By doing so, since reservation information such as a hotel which allots vacant rooms in advance is displayed on the reservation information input screen in the standard display form, a standardized and easy-to-understand interface can be provided to a user who reserves a plurality of hotels.

Next, when an input to the selection input screen is received (5), the reservation process (reservation data storing means 325) of the lodging reservation site server 3 is executed to determine the input lodging reservation data. In this example, since the franchise hotel A managed by the franchise hotel management server 10 is selected as a result of the determination, the lodging reservation data is transmitted to the franchise hotel management server 10 (6).

The franchise hotel management server 10 that received the lodging reservation data executes the reservation process (vacancy data updating means 123), which updates the vacant room information database 232 of the server 2 of the franchise hotel A based on the received lodging reservation data as illustrated in FIG. 11 (7), further updates the vacant room information database 132 of the franchise hotel management server 10 (8), and returns the results to the reservation process (reservation data storing means 325) of the lodging reservation site server 3 (9).

The reservation process (reservation data storing means 325) of the lodging reservation site server 3 updates the reservation information database 331 based on the reservation information that is transmitted from the reservation process (vacancy data updating means 123) of the franchise hotel management server 10 (10), creates the reservation completion information (11), and displays the reservation completion information on the monitor (output unit 45) of the user terminal 4 (12).

The reservation process (reservation data storing means 325) of the lodging reservation site server 3 senses changes in the vacant room information database 232 of the server 2 of the franchise hotel A, executes the vacant room information update process (vacancy data updating means 223) (13), which checks the vacant room information database 132 of the franchise hotel management server 10 (14) and executes the vacant room update process (vacancy data updating means 123) (15). The vacant room update process (vacancy data updating means 123) completes the processing of updating the vacant room information by synchronizing the data contained in the vacant room information database 132 of the franchise hotel management server 10 with the vacant room information database 332 of the lodging reservation site server 3 (16). The timing for the synchronization may be set in various ways. For example, it is preferable to set to update the vacant room information every three minutes even when the reservation is not made such that the newest vacant room information is always maintained.

Figure 33:
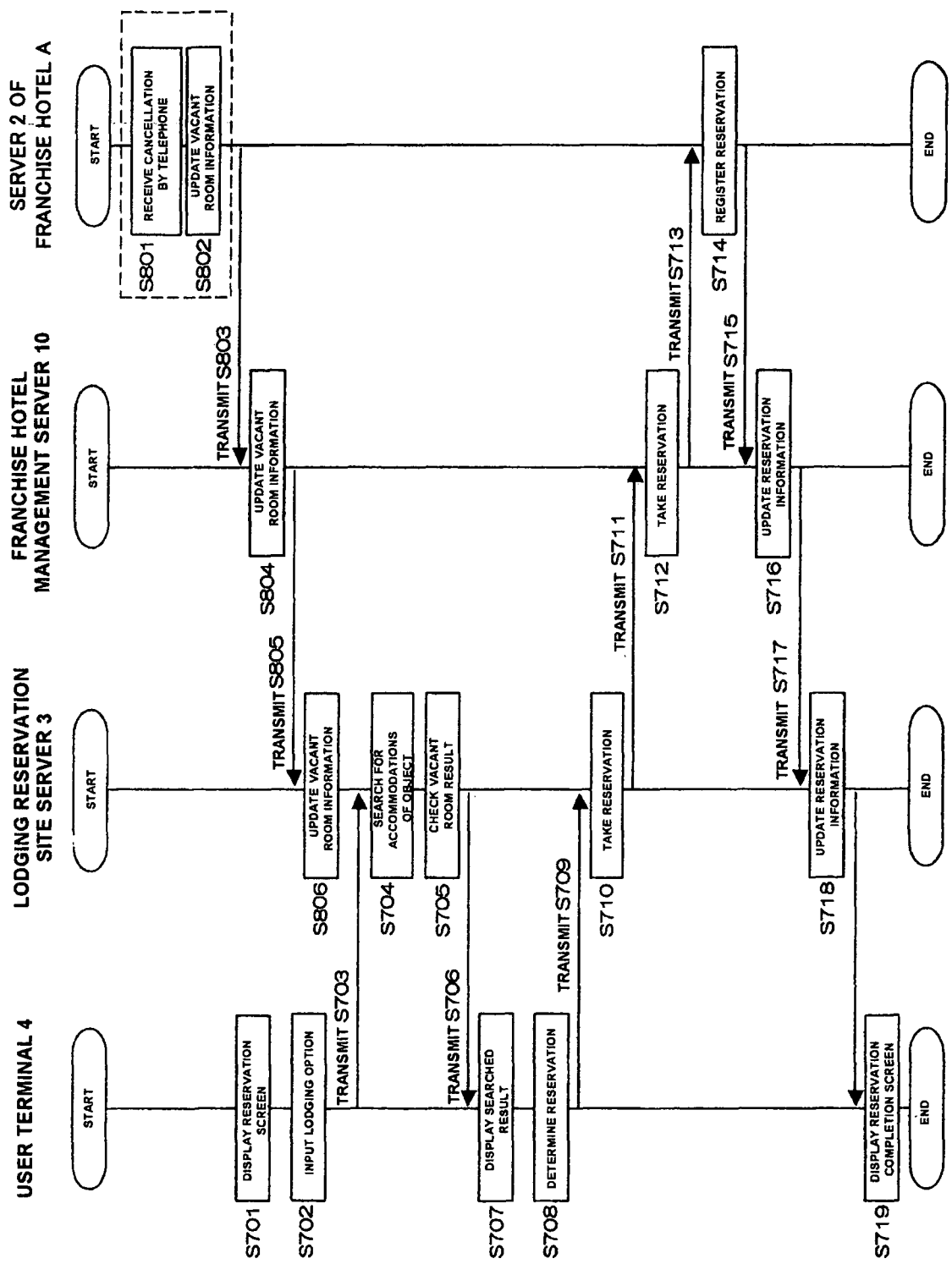
FIG. 33 is a sequence diagram illustrating a case when a franchise hotel A, managed by a franchise hotel reservation management system 10, is selected in the reservation system 1 according to the second embodiment of the present invention.

FIG. 33 is a sequence diagram illustrating a case when the franchise hotel A, managed by the franchise hotel reservation management system 10, is selected during the reservation registration in the reservation system 1 according to the second embodiment of the present invention. Hereinafter, the description of FIG. 33 will be concentrated to the difference from that of FIG. 15 showing a sequence diagram illustrating when the franchise hotel A is selected in the previous embodiment.

In the second embodiment, when the user terminal 4 searches for accommodations (S501 to S503), the lodging reservation site server 3 searches for data in the vacant room information database 332 (S504), and displays the searched results on the user terminal 4 (S505 to S507). In this case, the data in the vacant room information database 132 of the franchise hotel management server 10 is not referred.

The sequences from the determination of the reservation at the franchise hotel A by the user terminal 4 to the reservation completion (S508 to S519) are not different from the sequences (FIG. 15) in the previous embodiment.

FIG. 34 shows status of data changed by registering reservation information in the lodging reservation site server 3.

In the reservation information database 331, 'B. after reservation registration,' in comparison with 'A. before reservation registration,' further includes a single data containing a room type 'single' and a scheduled lodging date 'Jun. 10, 2008'. Accordingly, the number of remaining rooms of the room type 'single' on the scheduled lodging date 'Jun. 10, 2008' is updated from '25' of 'A. before reservation registration' to '24' of 'B. after reservation registration' in the vacant room information database 332.

FIG. 33 also illustrates processing of a case when the reservation of the franchise hotel A is cancelled. The sequences of second embodiment are different from those of the previous embodiment in that, when the cancellation is received by calling (S801), the vacant room information of the server 2 of the franchise hotel A and the franchise hotel management server 10 is updated (S802 to S803), and then the vacant room information of the lodging reservation site server 3 is also updated (S804).

(Processing of Cancellation)

Figure 35:
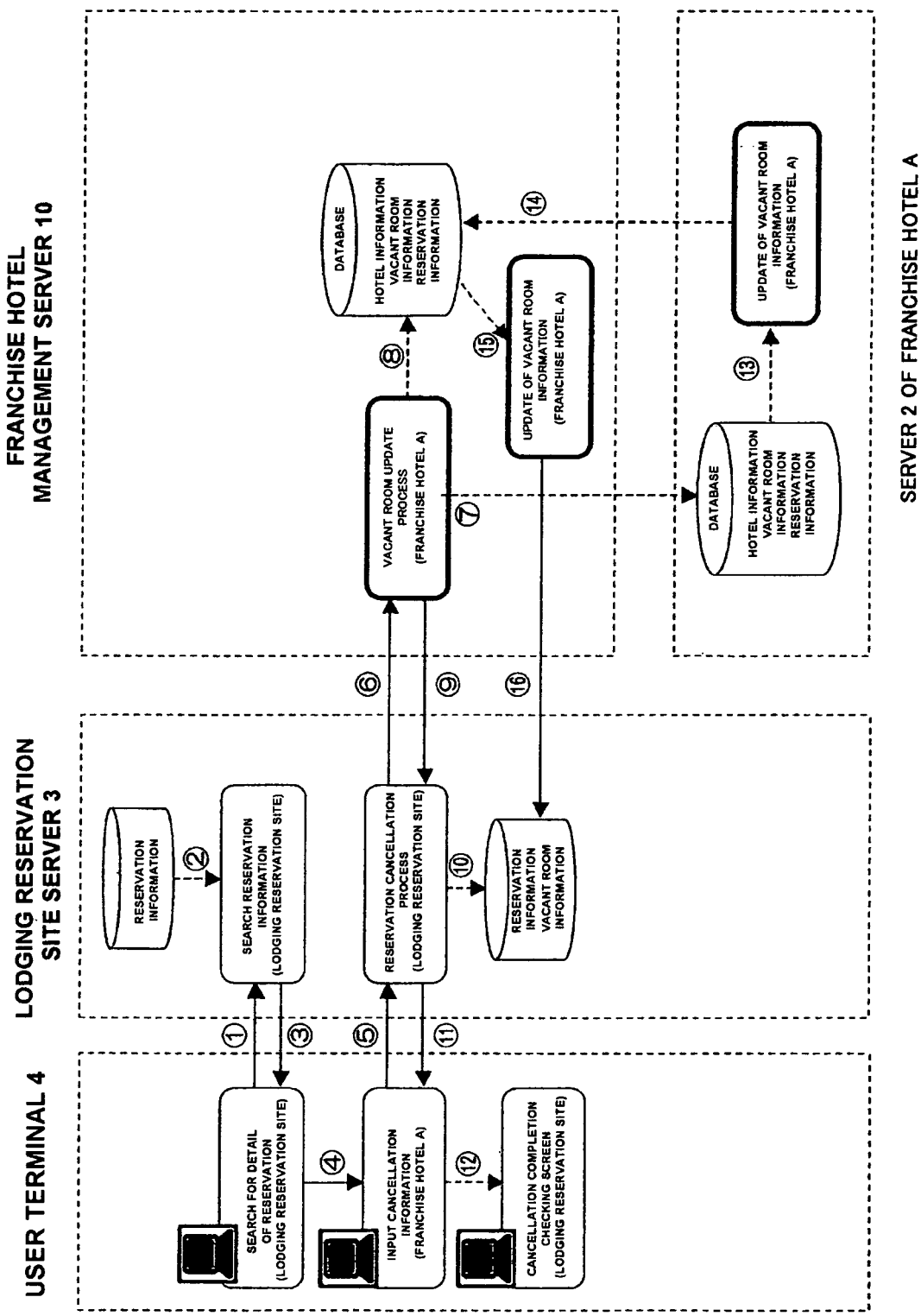
FIG. 35 is an explanatory diagram illustrating processing of cancellation of lodging reservation in the reservation system 1 according to the second embodiment of the present invention.

FIG. 35 illustrates flows of the cancellation of reservation in the second embodiment of the present invention. The flows of the cancellation of reservation in this embodiment will be described by focusing on the difference from those of FIG. 19 illustrating flows of cancellation of reservation in the first embodiment.

In the second embodiment, the input of the cancellation of reservation is received from the user terminal 4, the reservation cancellation process of the lodging reservation site server 3 is executed (5), the reservation cancellation process of the franchise hotel management server 10 is started (6) to update the vacant room information database 132 of the franchise hotel management server 10 (8) by updating the vacant room information database 232 of the server 2 of the franchise hotel A (7), and the updated results are returned to the reservation cancellation process of the lodging reservation site server 3 (9). The reservation cancellation process updates the vacant room information database 331 of the lodging reservation site server 3 (10), transmits the updated data in the form of a standard display form to the user terminal 4 (11), and displays a cancellation completion screen on the user terminal 4 (12).

Figure 36:
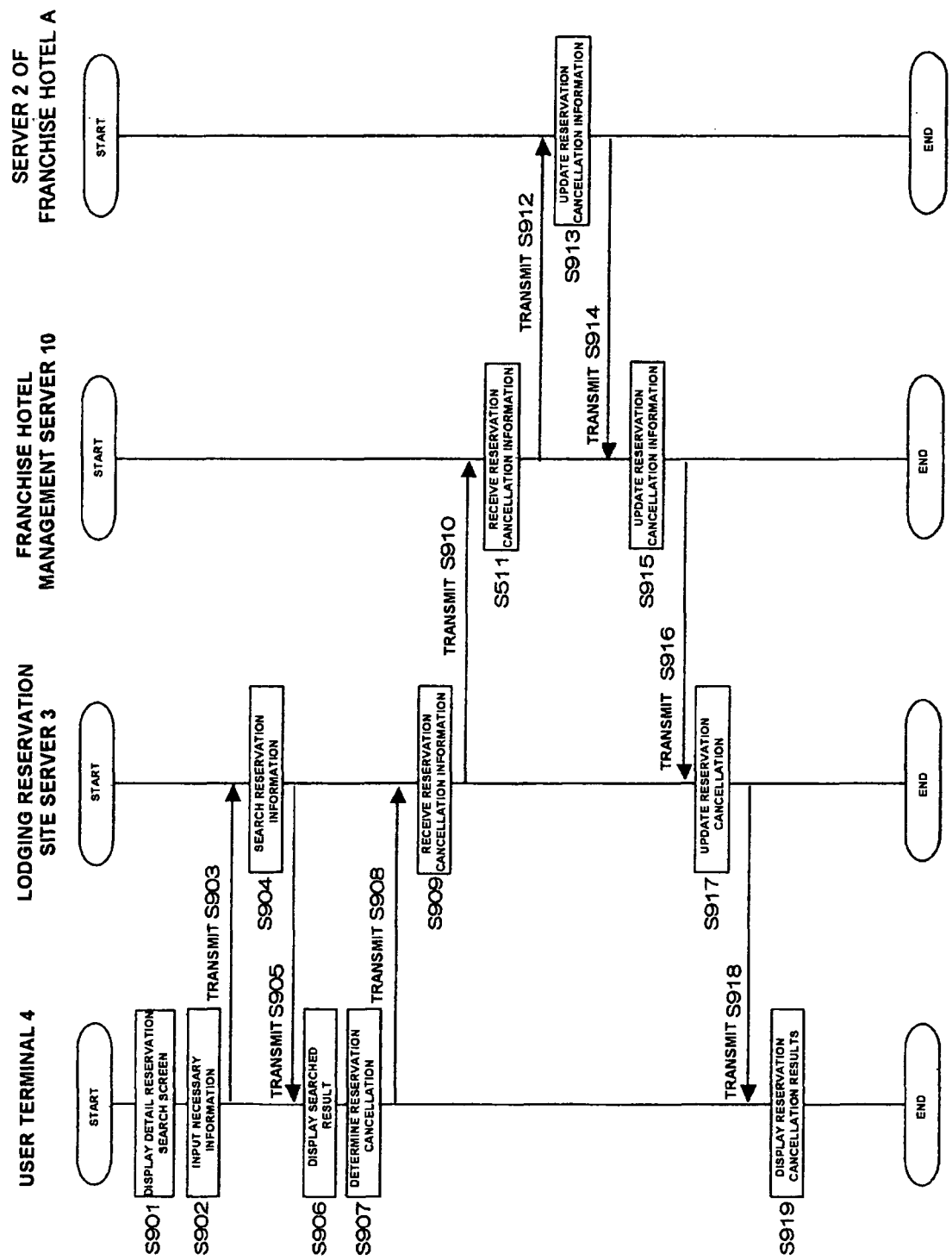
FIG. 36 is a sequence diagram illustrating the cancellation of the lodging reservation in the reservation system 1 according to the second embodiment of the present invention.

FIG. 36 is a sequence diagram illustrating the cancellation of reservation in the second embodiment. The sequences of FIG. 36 will be described by concentrating on the difference from the sequences of the first embodiment (FIG. 20).

In the second embodiment, the input of reservation cancellation from the user terminal 4 is not directly received by the franchise hotel management server 10 but by the lodging reservation site server 3 (S909). FIG. 37 shows an example of a screen for canceling reservation displayed by the lodging reservation site server 3. The reservation cancellation screen is displayed on the user terminal 4 via the lodging reservation site server 3 even after the updating of information.

FIG. 38 shows status of data changed by the cancelled reservation in the lodging reservation site server 3.

In the reservation information database 331, 'B. after reservation registration,' in comparison with 'A. before reservation registration,' the status is changed from 'reserved' into 'cancelled' on the data containing a room type 'single' and a scheduled lodging date 'Jun. 10, 2008'. Accordingly, the number of remaining rooms of the room type 'single' on the scheduled lodging date 'Jun. 10, 2008' is updated from '24' of 'A. before reservation registration' to '25' of 'B. after reservation registration' in the vacant room information database 332.

Effect of this Embodiment

According to the second embodiment, even when a hotel managed by the franchise hotel management server 10 is selected, since the data to be displayed on the monitor (output unit 45) of the user terminal 4 is created by the lodging reservation site server 3, a standardized and easy-to-understand interface can be provided to a user who reserves a plurality of hotels.

Moreover, since the lodging reservation site server 3 relays transmission of data from the user terminal 4 to the franchise hotel management server 10 or vise versa, the flow of the reservation for lodging from the inquiry to the confirm of the reservation completion can be checked.

Although the system for taking reservation a hotel for lodging has been described in the reservation system 1 according to second embodiment of the present invention, the reservation system may be applied to various facilities such as a sports center, a culture center, and the like by modifying various settings.

Third Embodiment

Next, a reservation system according to a third embodiment of the present invention will be described.

Figure 39:
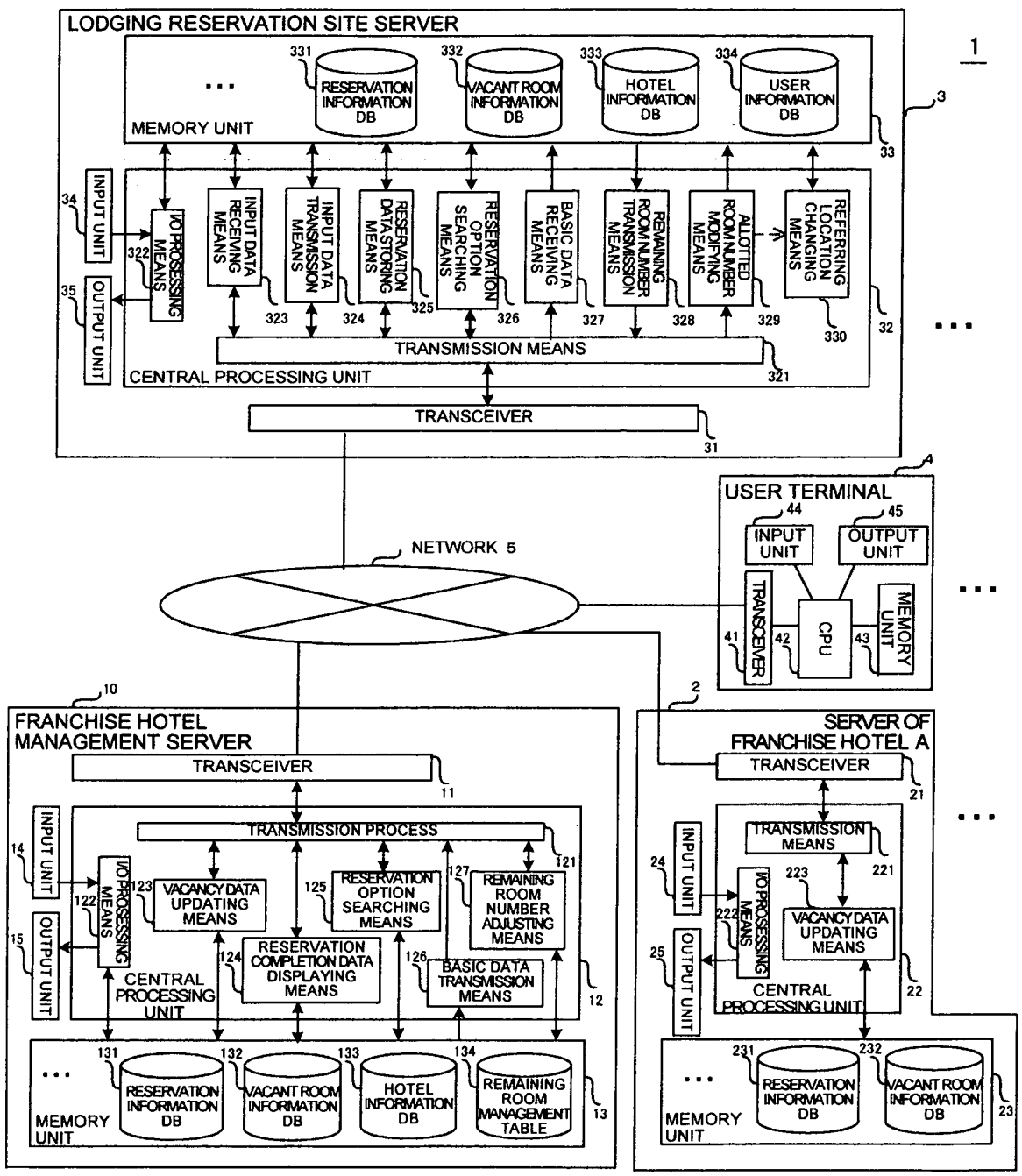
FIG. 39 is a functional block diagram of a reservation system 1 according to the second embodiment of the present invention.

FIG. 39 is a functional block diagram of a reservation system 1 according to this embodiment of the present invention.

The reservation system 1 according to this embodiment, in comparison to the reservation system 1 as illustrated in FIG. 2, is configured by adding a basic data transmission means 126 transmitting the number allotted to each of the lodging reservation sites of the franchise hotels and other basic data to each of the lodging reservation site servers 3 and a remaining room number adjusting means 127 automatically adjusting the number of remaining rooms of each of the lodging reservation site servers 3 at a preset time before the closing time of reservations to the franchise hotel management server 10 that accesses to a plurality of lodging reservation site servers 3, and by adding a basic data receiving means 327 receiving the basic data from the franchise hotel management server 10, a remaining room number transmission means 328 transmitting the number of remaining rooms at a preset time before the closing time of reservation to the franchise hotel management server 10, an allotted room number modifying means 329 modifying the number of allotted rooms based on the notice of modifying the allotted number transmitted from the franchise hotel management server 10, and a referring location changing means 330 changing the scheduled lodging date referring locations of the hotel information database 333 to each of the lodging reservation site servers 3.

Operations of the reservation system according to this embodiment of the present invention will be described below.

(Setting of Basic Data)

In the franchise hotel management server 10, an operator inputs the allotted number of rooms and the reference number of rooms of each of the lodging reservation sites of the franchise hotels as basic data provided to manage the remaining rooms via input unit 14. The input basic data are stored in the remaining room management table 134 of the memory unit 13 by the input and output means 122.

FIG. 40 shows an example of data structure of the remaining room management table 134. The remaining room management table 134 is created for each of the franchise hotels and holds the number of allotted rooms, the reference number of remaining rooms, and other items as listed in FIG. 40 for every lodging reservation site. Especially, although not listed in FIG. 40, the number of allotted rooms is classified according to necessary information such as room type, room charge, or scheduled lodging date. The memory unit 13 stores the closing time of reservation and a limit time, that is, a reference time for the management of the remaining rooms, as common information for the management of the remaining rooms, in which the closing time and the limit time are input from the input unit 14 like the basic data.

The basic data transmission means 126 extracts the number of allotted rooms of the franchise hotel at every lodging reservation site from the remaining room management table 14 when the operator requests for transmission or a preset time is arrived. Then, the basic data transmission means 126 transmits the number of allotted rooms with the closing time of reservation and the limit time to each of the lodging reservation site servers 3.

Each of the lodging reservation site servers 3, when the basic data receiving means 327 receives the basic data transmitted from the franchise hotel management server 10, stores the number of allotted rooms of the received data to be assigned to the hotel name (i.e. identification information of franchise hotel; hotel ID) as the number of rooms in charge of the vacant room information database 332. Moreover, the closing time of reservation and the limit time are stored as the common information of each of the franchise hotels in the memory unit 33.

(Adjustment of the Number of Remaining Rooms)

The remaining room number transmission means 328 of the lodging reservation site server 3 is activated at the limit time of the closing time of reservation (for example, one hour before the closing time), extracts the number of remaining rooms of each of the franchise hotels that is stored in the vacant room information database 332, and transmits an ID (hotel ID) and the number of remaining rooms of a corresponding hotel to the franchise hotel management server 10 for managing the corresponding hotel.

Figure 41:
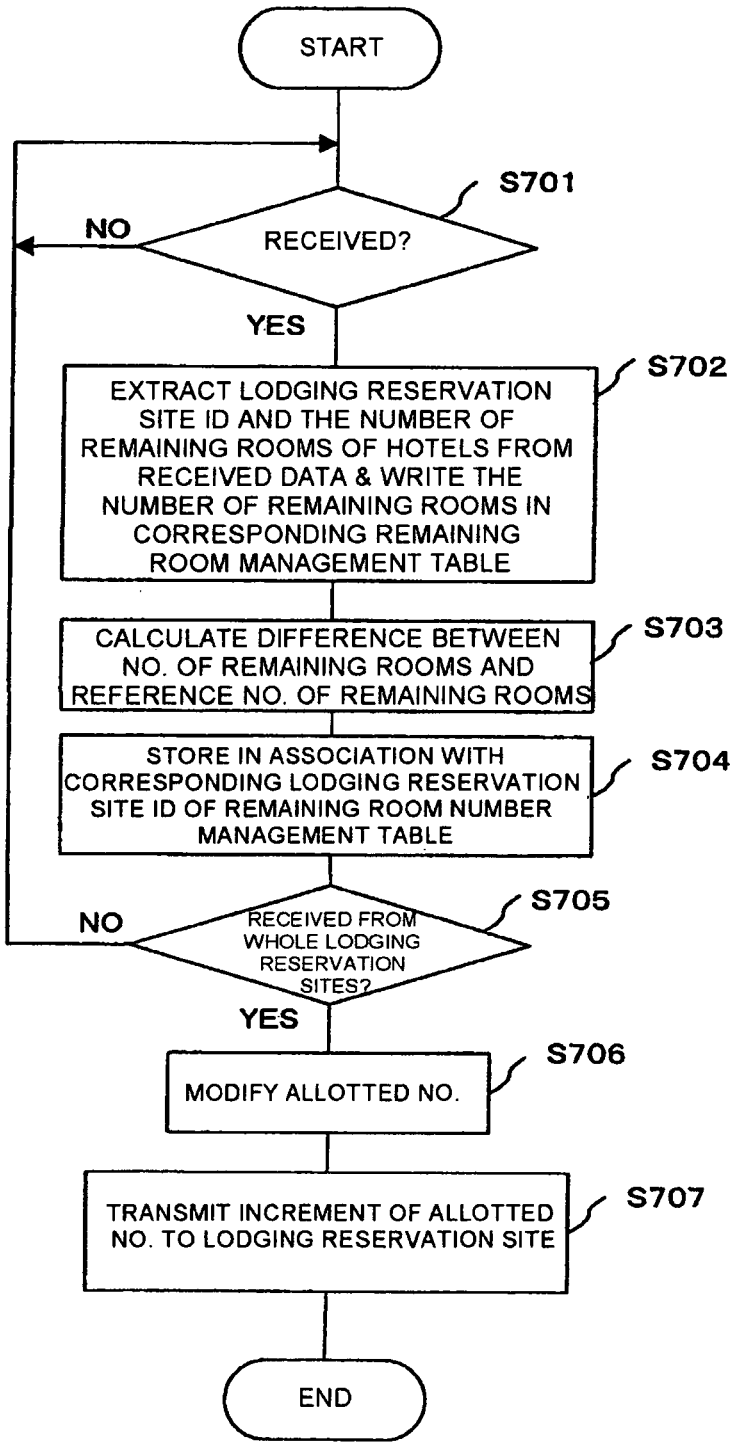
FIG. 41 is a flowchart illustrating processing performed by a remaining room adjusting means 127 of FIG. 39.

Next, processing by the remaining room number adjusting means 127 of the franchise hotel management server 10 will be described with reference to FIG. 41. The remaining room number adjusting means 127, when the information is received from the remaining room number transmission means 328 of the lodging reservation site server 3 ('YES' at S701), extracts the number of remaining rooms from the received data and stores the extracted number of remaining rooms in a blank of the number of remaining rooms of the remaining room management table 134 of the hotel ID corresponding to the a lodging reservation site ID of a transmission source (S702). The lodging reservation site ID, that is, identification information of the lodging reservation site server may be contained in the transmitted data or may be particularly determined from address of the transmission source. Then, the difference between the number of remaining rooms and the reference number of remaining rooms (including positive and negative symbols) is calculated (S703). The calculation result is written into the remaining room management table 134 (S704).

After that, whether the number of remaining rooms is received from all lodging reservation site servers 3 is determined (S705). If the determination is 'NO' at S705, then return to the step S701 and, if the determination is 'YES' at S705, then the allotted number is modified based on the difference between the number of remaining rooms and the reference number of remaining rooms in every lodging reservation site IDs that are stored in the remaining room management table 134 (S706). In the modification, when a total number of the lodging reservation site IDs is set to n, the number of remaining rooms corresponding to k-th lodging reservation ID is $a_k$, the reference number of remaining rooms is $b_k$, and an increment of the allotted number is $c_k$, the increment of the allotted number $c_k$ can be obtain from the following equation.

$$C_k = \frac{\sum_{i=1}^{n}(a_i - b_i)}{n} - (a_k - b_k) \qquad \text{[Equation 1]}$$

This is a distribution method of making the differences between the numbers of remaining rooms and the reference numbers of remaining rooms in the respective lodging reservation sites equal, however other distribution methods such as giving a weight to a current allotted number can be adopted.

The remaining number adjusting means 127 stores the modified result as an increment of the allotted number in the remaining room management table 134 and transmits the modified result to the lodging reservation site server 3 (S707).

When the increment of the allotted number is received, the allotted room number modifying means 329 of each lodging reservation site server 3 modifies the number of rooms in charge in the vacant room information database 332 based on the increment of the allotted number and modifies the number of remaining rooms. For example, when an increment of the allotted number at a hotel is +1, 1 (one) is added to the current number of rooms in charge and the number of remaining rooms. After this, the referring location changing means 330 is activated.

(Change of Referring Location)

Figure 42:
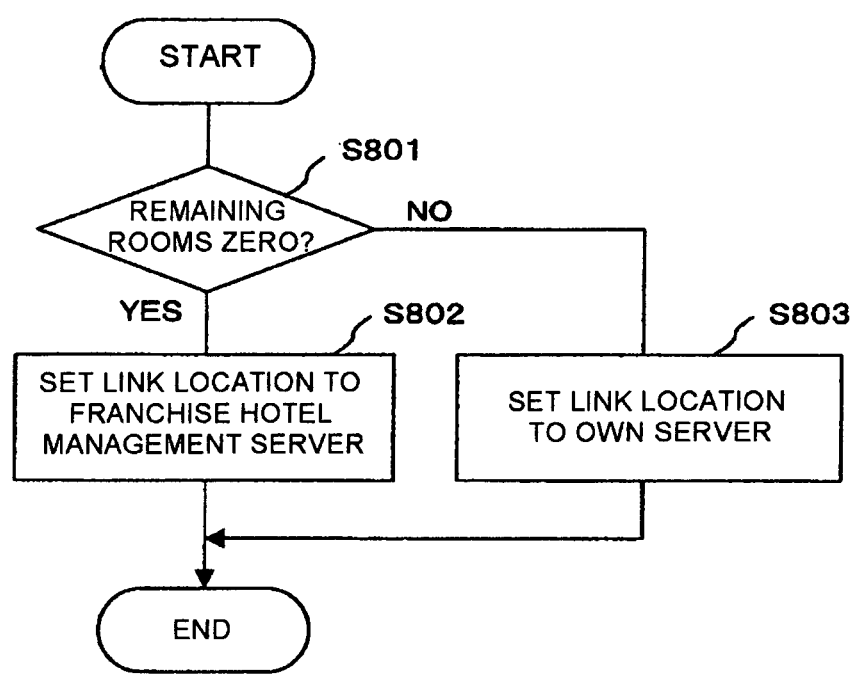
FIG. 42 is a flowchart illustrating processing performed by a referring location changing means 330 of FIG. 39.

Next, operation of the referring location changing means 330 of the lodging reservation site server 3 will be described with reference to FIG. 42. The referring location changing means 330, when the allotted room number modifying means 329 request for activation or when the referring location changing means 330 is periodically activated, accesses to the vacant room information database 332 and determines whether the number of remaining rooms is zero at every hotel (S801), and sets link information to the franchise hotel management server managing a corresponding hotel as information on the scheduled lodging date referring location (i.e. reference target) of the hotel information database 333 when the number of remaining rooms is zero (S802). If the number of remaining room is not zero, the vacant room information database 332 of its own server is set as the referring location (S803).

Effect of this Embodiment

According to this embodiment, since, with the adjustment of the number of remaining rooms, each of the franchise hotel management servers maintains total number of taken reservations made through the lodging reservation site and the number of remaining rooms is adjusted between a plurality of lodging reservation sites, efficient management of reservations is achieved. Since the referring location is automatically changed into the franchise hotel management server by the referring location changing means when the number of remaining rooms is zero, reservation can be taken without fail. Especially, when reservation is crowded and complicated, another reservation may be frequently registered while search for accommodations to the reservation registration is being performed. In this case, possibility of reservation success decreases. However, since the number of remaining rooms of respective lodging reservation sites is equalized and the referring location is changed into the franchise hotel management server when the number of remaining rooms is zero by processing performed in this embodiment, the timing that makes invalid reservation can be reduced. Especially, since the increment or the decrement of the allotted number is transmitted to the respective lodging reservation site servers and each of the lodging reservation site servers modifies the number of rooms in charge and the number of remaining rooms when the corresponding increment or decrement is received for equalization of the number of remaining rooms, it is possible to keep down mismatch caused by reservation processing during the time from the transmission of the number of remaining rooms to the reception of the increment or the decrement.

The above-mentioned embodiments of the present invention are provided for easy description and understanding of the present invention with specific examples but do not limit the scope of the present invention. It will be appreciated by those skilled in the art that various changes and modifications may be practiced without departing from the spirit of the present invention. For example, in FIGS. 2 and 39, it is possible that the functions of the individual server of the franchise hotel are integrated to the functions of the franchise hotel management server managing a plurality of franchise hotels and the server of the franchise hotel A is implemented in a user terminal. Moreover, in the third embodiment, the adjustment of the number of remaining rooms may be performed several times, at a preset time before the closing time of reservation, or in a gradually shorter cycle as the closing time approaches. In this case, the reference number of remaining rooms for calculating the increment of the allotted number can be obtained by multiplying the ratio between the limit time and the remaining time to the closing time of reservation by the reference number of remaining rooms set in the remaining room management table 134. Accordingly, the reservation system of the present invention can respond rapidly and flexibly with urgent request for reservation or cancellation occurring just before the closing time.

Moreover, the respective means may be operated individually or in associated with each other. For example, the referring location changing means may be activated or not regardless of other means that are functions of CPU.

DIAGRAM INDEX

1 RESERVATION SYSTEM
2 SERVER OF FRANCHISE HOTEL A
3 LODGING RESERVATION SITE SERVER
4 USER TERMINAL
5 NETWORK
10 FRANCHISE HOTEL MANAGEMENT SERVER
11,21,31,41 TRANSCEIVER
12,22,32,42 CENTRAL PROCESSING UNIT
13,23,33,43 MEMORY UNIT
14,24,34,44 INPUT UNIT
15,25,35,45 OUTPUT UNIT
121,221,321 TRANSMISSION MEANS
122,222,322 I/O PROCESSING MEANS
123,223 VACANCY DATA UPDATING MEANS
124 RESERVATION COMPLETION DATA DISPLAYING MEANS
125,326 RESERVATION OPTION SEARCHING MEANS
126 BASIC DATA TRANSMISSION MEANS
127 REMAINING ROOM NUMBER ADJUSTING MEANS
131,231,231 RESERVATION INFORMATION DATABASE
132,232,332 VACANT ROOM INFORMATION DATABASE
133,233 HOTEL INFORMATION DATABASE
134 REMAINING ROOM MANAGEMENT TABLE
323 INPUT DATA RECEIVING MEANS
324 INPUT DATA TRANSMISSION MEANS
325 RESERVATION DATA STORING MEANS
327 BASIC DATA RECEIVING MEANS
328 REMAINING ROOM NUMBER TRANSMISSION MEANS
329 ALLOTTED ROOM NUMBER MODIFYING MEANS
330 REFERRING LOCATION CHANGING MEANS
334 USER DATABASE

What is claimed is:

1. A reservation system for performing reservations of user, comprising:
  a first computer performing reservations of a plurality of facilities requested from a user terminal accessed through a network, wherein the plurality of facilities include a general facility, a certain number of rooms of the general facility are allotted for reservation to a lodging reservation site, and a specific facility, no room of the specific facility are allotted for reservation to the lodging reservation site, the first computer further having a first vacant room information database to store the certain number of rooms allotted for reservation of the general facility and vacancy data of the certain number of rooms for respective date;

a second computer accessing the first computer through a network and having a second vacant room information database to store vacancy data of a predetermined specific facility among the plurality of facilities for respective date;

wherein the first computer includes:
  a central processing device for controlling an overall operation of the first computer;
  a hotel information database to store property data containing a location and an address of a source for obtaining the vacancy data for the general facility and the specific facility, the location and the address of the source being associated with each other, where the address for the general facility is that of the first vacant room information database and the address for the specific facility is an external link information on a server which manages the specific facility;
  a reservation information database to store reservation data containing a lodging date for the general facility and the specific facility; and
  the central processing device of the first computer is specifically configured to conduct the following operations of:
    performing a reservation option searching process that executes the following steps when receiving data including a lodging date and a location where the user wishes to lodge are received:
      (1) accessing the hotel information database and extracting a facility based on the property data and the received data;
      (2) extracting an address of a source for obtaining the vacancy data corresponding to the extracted facility;
      (3) accessing the extracted address and determining whether or not there exists a vacancy on the lodging date which was included in the received data:
    performing an input data receiving process that displays an input screen for reservation at more than one facility including a general facility and a specific facility for which the reservation option searching process determined as a vacancy exists on a user terminal, and receives input data which is inputted to the user terminal;
    performing a reservation data storing process that creates the reservation data, when the input data includes the general facility to which the reservation is allotted based on the input data and writes the created reservation data into the reservation information database;
    performing an input data transmission process that transmits the input data containing the specific facility, when the input data includes the specific facility, based on the address extracted by the reservation option searching process; and
    performing a referring location changing process that changes an address of a source in the hotel information database, only when the number of remaining rooms of a facility in the first vacant room information database falls below a preset number, from the address of the first vacant room information database to the external link information on the server which manages a corresponding facility; wherein the second computer includes:
  a hotel information database of the second computer containing data on locations, room types, and room charge of corresponding hotel location and room types, and the hotel information database of the second computer being configured to output SQL data when hotel information data of the second computer is modified,
  a central processing device for controlling an overall operation of the second computer and the central processing device being configured to process the SQL data into XML data and transmit the hotel information data to the central processing device of the first computer which is configured to process the XML data into SQL data to update the hotel information database of the first computer, wherein the central processing device of the second computer is specifically configured to conduct the following operations of:
    performing a vacancy data updating process that operates to decrease the number of rooms on the lodging date for the specific facility which was included in the input data from the vacancy data stored in the second vacant room information database, when the input data transmitted from the first computer was received; and
    performing a reservation completion data displaying process that creates, after the operation of the vacancy data updating process, reservation completion data for the specific facility based on the input data, and transmits the reservation completion data to the first computer;
  wherein the reservation data storing process of the first computer further creates reservation data on the specific facility based on the reservation completion data transmitted from the second computer and writes the created reservation data on the specific facility into the reservation information database.

2. The reservation system according to claim 1, wherein the first computer includes data synchronized with the vacancy data of a specific facility for respective date in the second computer;
the reservation option searching process of the first computer determines whether there is a remaining room of a specific facility for respective date which the user wishes to lodge.

3. The reservation system according to claim 1,
wherein the first computer is configured by a plurality of reservation site servers where the second computer accesses the plurality of the reservation site servers, where each of the reservation site servers includes:
  a database storing the certain number of allotted rooms and the number of remaining rooms of every facility;
  a remaining room number transmission unit that transmits the number of remaining rooms to the second computer at a preset time before a closing time of reservation;
  an allotted room number modifying unit that updates the certain number of allotted rooms and the number of remaining rooms based on increment data of the certain number of allotted rooms transmitted from the second computer when the increment data is received; and
  a database storing a source of obtaining the vacancy data of every facility; and a referring location changing unit that changes the source based on the number of remaining rooms of every facility;

wherein the second computer includes a remaining room number adjusting unit that modifies the certain number of allotted rooms for reservation of the first computer in every facility based on the number of remaining rooms that is transmitted from the first computer and transmitting increment data of the certain number of allotted rooms to the first computer.

4. The reservation system according to claim 2, wherein the first computer is configured by a plurality of reservation site servers where the second computer accesses the plurality of the reservation site servers, where each of the reservation site servers includes:

a database storing the certain number of allotted rooms and the number of remaining rooms of every facility;

a remaining room number transmission unit that transmits the number of remaining rooms to the second computer at a preset time before a closing time of reservation;

an allotted room number modifying unit that updates the certain number of allotted rooms and the number of remaining rooms based on increment data of the certain number of allotted rooms transmitted from the second computer when the increment data is received; and a database storing a source of obtaining the vacancy data of every facility; and a referring location changing unit that changes the source based on the number of remaining rooms of every facility;

wherein the second computer includes a remaining room number adjusting unit that modifies the certain number of allotted rooms for reservation of the first computer in every facility based on the number of remaining rooms that is transmitted from the first computer and transmitting increment data of the certain number of allotted rooms to the first computer.

* * * * *